(12) United States Patent
Davis

(10) Patent No.: US 12,347,255 B2
(45) Date of Patent: Jul. 1, 2025

(54) REMOTE AUDITING OF ELECTRONIC KEYS

(71) Applicant: Videx, Inc., Corvallis, OR (US)

(72) Inventor: Paul R. Davis, Corvallis, OR (US)

(73) Assignee: Videx, Inc., Corvallis, OR (US)

( * ) Notice: Subject to any disclaimer, the term of this patent is extended or adjusted under 35 U.S.C. 154(b) by 0 days.

(21) Appl. No.: 17/864,637

(22) Filed: Jul. 14, 2022

(65) Prior Publication Data

US 2022/0358802 A1 Nov. 10, 2022

Related U.S. Application Data

(63) Continuation of application No. 16/865,091, filed on May 1, 2020, now Pat. No. 11,423,723, which is a
(Continued)

(51) Int. Cl.
*G07C 9/00* (2020.01)
*G07C 9/21* (2020.01)
(Continued)

(52) U.S. Cl.
CPC ..... *G07C 9/00857* (2013.01); *G07C 9/00309* (2013.01); *G07C 9/21* (2020.01);
(Continued)

(58) Field of Classification Search
CPC .. G07C 9/00857; G07C 9/21; G07C 9/00309; G07C 2009/00476; G07C 2009/00587;
(Continued)

(56) References Cited

U.S. PATENT DOCUMENTS 4,338,526 A 7/1982 Martin et al.
4,712,398 A 12/1987 Clarkson et al.
(Continued)

FOREIGN PATENT DOCUMENTS

EP 2348490 A1 7/2011
EP 2085934 B1 7/2013
(Continued)

OTHER PUBLICATIONS

UTC Fire & Security Americas Corporation, Inc., "eKEY® for Android™ User Manual", Rev May 2, 2011, Supraekey.com, retrieved from the Internet: <URL:http://www.supraekey.com/Documents/ekey-android-uman.pdf>, [available on the Internet at least as early as Jan. 16, 2013].
(Continued)

*Primary Examiner* — Kam Wan Ma
(74) *Attorney, Agent, or Firm* — Matthew D. Eskue

(57) ABSTRACT

Embodiments relate to enhanced auditing features for administration of remote electronic keys. Based on access control information associated with the electronic key, an unlocking signal is conveyed from the electronic key that causes an electronic lock to change from a locked state to an unlocked state, thereby permitting a user of the key to access one or more resources secured by the lock. The electronic key stores details related to the unlocking event in memory sites. In some aspects, the electronic key broadcasts a message via a wireless wide area network (WWAN). The message may include a request to establish a WWAN communications link with an access control server located away from the electronic key. Responsive to establishing the WWAN communications link, the electronic key initiates a transfer of data to the access control server, the data including details related to the unlocking event.

20 Claims, 9 Drawing Sheets

Related U.S. Application Data continuation of application No. 16/175,625, filed on Oct. 30, 2018, now Pat. No. 10,643,414, which is a continuation of application No. 15/596,201, filed on May 16, 2017, now Pat. No. 10,115,256, which is a continuation-in-part of application No. 14/680,048, filed on Apr. 6, 2015, now Pat. No. 9,841,743.

(60) Provisional application No. 61/975,911, filed on Apr. 7, 2014.

(51) Int. Cl.
*H04L 9/40* (2022.01)
*H04W 12/06* (2021.01)
*H04W 12/08* (2021.01)
*H04W 12/63* (2021.01)
*H04W 12/68* (2021.01)

(52) U.S. Cl.
CPC ......... *H04L 63/0861* (2013.01); *H04W 12/06* (2013.01); *H04W 12/08* (2013.01); *G07C 2009/00476* (2013.01); *G07C 2009/00587* (2013.01); *G07C 2009/00769* (2013.01); *G07C 2009/00865* (2013.01); *G07C 2009/0088* (2013.01); *H04L 63/0492* (2013.01); *H04W 12/63* (2021.01); *H04W 12/68* (2021.01)

(58) Field of Classification Search
CPC ........... G07C 2009/00769; G07C 2009/00865; G07C 2009/0088; H04W 12/06; H04W 12/08
USPC ....................................................... 340/5.61
See application file for complete search history.

(56) References Cited

U.S. PATENT DOCUMENTS

| | | | |
|---|---|---|---|
| 4,789,859 A | 12/1988 | Clarkson et al. | |
| 4,829,296 A | 5/1989 | Clark et al. | |
| 4,887,292 A | 12/1989 | Barrett et al. | |
| 4,916,443 A | 4/1990 | Barrett et al. | |
| 5,046,084 A | 9/1991 | Barrett et al. | |
| 5,140,317 A | 8/1992 | Hyatt, Jr. et al. | |
| 5,170,431 A | 12/1992 | Dawson et al. | |
| 5,245,652 A | 9/1993 | Larson et al. | |
| 5,280,518 A * | 1/1994 | Danler | G07C 9/00817 340/5.23 |
| 5,319,362 A | 6/1994 | Hyatt, Jr. | |
| 5,351,042 A | 9/1994 | Aston | |
| 5,617,082 A | 4/1997 | Denison et al. | |
| 5,745,044 A | 4/1998 | Hyatt, Jr. et al. | |
| 5,815,557 A | 9/1998 | Larson | |
| 6,000,609 A | 12/1999 | Gokcebay et al. | |
| 6,005,487 A | 12/1999 | Hyatt, Jr. et al. | |
| 6,359,547 B1 | 3/2002 | Denison et al. | |
| 6,374,653 B1 | 4/2002 | Gokcebay et al. | |
| 6,472,973 B1 * | 10/2002 | Harold | G07C 9/23 340/5.1 |
| 6,474,122 B2 | 11/2002 | Davis | |
| 6,552,650 B1 | 4/2003 | Gokcebay et al. | |
| 6,564,600 B1 | 5/2003 | Davis | |
| 6,581,161 B1 | 6/2003 | Byford | |
| 6,604,394 B2 | 8/2003 | Davis | |
| 6,615,625 B2 | 9/2003 | Davis | |
| 6,718,806 B2 | 4/2004 | Davis | |
| 6,720,861 B1 | 4/2004 | Rodenbeck et al. | |
| 6,822,552 B2 | 11/2004 | Lidén et al. | |
| 6,822,553 B1 | 11/2004 | Henderson et al. | |
| 6,895,792 B2 | 5/2005 | Davis | |
| 6,900,720 B2 | 5/2005 | Denison et al. | |
| 6,937,140 B1 | 8/2005 | Outslay et al. | |
| 6,948,070 B1 | 9/2005 | Ginter et al. | |
| 6,977,576 B2 | 12/2005 | Denison et al. | |
| 7,012,503 B2 | 3/2006 | Nielsen | |
| 7,019,615 B2 | 3/2006 | Denison et al. | |
| 7,145,434 B2 | 12/2006 | Mlynarczyk et al. | |
| 7,181,507 B1 | 2/2007 | Lavelle et al. | |
| 7,295,100 B2 | 11/2007 | Denison et al. | |
| 7,334,443 B2 | 2/2008 | Meekma et al. | |
| 7,373,352 B2 | 5/2008 | Roatis et al. | |
| 7,456,725 B2 | 11/2008 | Denison et al. | |
| 7,471,199 B2 | 12/2008 | Zimmerman et al. | |
| 7,482,907 B2 | 1/2009 | Denison et al. | |
| 7,495,543 B2 | 2/2009 | Denison et al. | |
| 7,600,129 B2 | 10/2009 | Libin et al. | |
| 7,606,558 B2 | 10/2009 | Despain et al. | |
| 7,683,758 B2 | 3/2010 | Denison et al. | |
| 7,706,778 B2 | 4/2010 | Lowe | |
| 7,716,489 B1 | 5/2010 | Brandt et al. | |
| 7,724,687 B2 | 5/2010 | Autret et al. | |
| 7,734,068 B2 | 6/2010 | Fisher | |
| 7,741,952 B2 | 6/2010 | Denison et al. | |
| 7,821,395 B2 | 10/2010 | Denison et al. | |
| 7,822,989 B2 | 10/2010 | Libin et al. | |
| 7,999,656 B2 | 8/2011 | Fisher | |
| 8,045,961 B2 | 10/2011 | Ayed et al. | |
| 8,063,734 B2 | 11/2011 | Conforti | |
| 8,074,271 B2 | 12/2011 | Davis et al. | |
| 8,102,799 B2 | 1/2012 | Alexander et al. | |
| 8,150,374 B2 | 4/2012 | Lowe | |
| 8,199,019 B2 | 6/2012 | Kaczmarz et al. | |
| 8,232,879 B2 | 7/2012 | Davis | |
| 8,260,262 B2 | 9/2012 | Ben Ayed | |
| 8,334,765 B2 | 12/2012 | Weinstein et al. | |
| 8,368,507 B2 | 2/2013 | Conreux et al. | |
| 8,370,911 B1 | 2/2013 | Mallard | |
| 8,384,548 B2 | 2/2013 | Knopf et al. | |
| 8,427,320 B2 | 4/2013 | Davis | |
| 8,473,619 B2 | 6/2013 | Baum et al. | |
| 8,482,379 B2 | 7/2013 | Conreux et al. | |
| 8,587,405 B2 * | 11/2013 | Denison | G07C 9/00182 340/5.9 |
| 8,593,252 B2 | 11/2013 | Fisher | |
| 8,600,899 B1 | 12/2013 | Davis | |
| 8,635,462 B2 | 1/2014 | Ullmann | |
| 8,643,487 B2 | 2/2014 | Roatis et al. | |
| 8,682,245 B2 | 3/2014 | Fyke et al. | |
| 8,689,013 B2 | 4/2014 | Habraken | |
| 8,742,889 B2 | 6/2014 | Kaczmarz et al. | |
| 8,756,431 B1 | 6/2014 | Despain et al. | |
| 8,943,187 B1 | 1/2015 | Saylor | |
| 8,970,344 B2 | 3/2015 | Payson et al. | |
| 9,509,719 B2 | 11/2016 | Neely | |
| 9,512,643 B1 | 12/2016 | Keefe | |
| 9,542,785 B2 * | 1/2017 | Meganck | G07C 9/00674 |
| 9,841,743 B2 | 12/2017 | Davis | |
| 9,847,020 B2 | 12/2017 | Davis | |
| 10,115,256 B2 | 10/2018 | Davis | |
| 10,339,736 B2 | 7/2019 | Sivalingam et al. | |
| 10,347,063 B1 | 7/2019 | LaRovere et al. | |
| 10,373,486 B2 | 8/2019 | Davis | |
| 10,423,136 B2 | 9/2019 | Davis | |
| 10,643,414 B2 | 5/2020 | Davis | |
| 10,643,461 B2 | 5/2020 | Davis | |
| 11,120,658 B1 | 9/2021 | Marques et al. | |
| 2002/0180582 A1 | 12/2002 | Nielsen | |
| 2006/0045107 A1 | 3/2006 | Kucenas et al. | |
| 2006/0136717 A1 | 6/2006 | Buer et al. | |
| 2006/0164206 A1 | 7/2006 | Buckingham et al. | |
| 2006/0170533 A1 | 8/2006 | Chioiu et al. | |
| 2007/0026801 A1 | 2/2007 | Gerstenkorn | |
| 2007/0096870 A1 | 5/2007 | Fisher | |
| 2008/0136649 A1 | 6/2008 | Van De Hey | |
| 2008/0163361 A1 | 7/2008 | Davis et al. | |
| 2009/0051486 A1 | 2/2009 | Denison et al. | |
| 2010/0300163 A1 | 12/2010 | Loughlin et al. | |
| 2010/0328201 A1 | 12/2010 | Marvit et al. | |
| 2011/0191126 A1 | 8/2011 | Hampshire et al. | |
| 2011/0276609 A1 | 11/2011 | Denison | |
| 2011/0289123 A1 | 11/2011 | Denison | |
| 2011/0311052 A1 | 12/2011 | Myers et al. | |
| 2012/0011366 A1 | 1/2012 | Denison | |

(56) References Cited

U.S. PATENT DOCUMENTS

| | | |
|---|---|---|
| 2012/0011367 A1 | 1/2012 | Denison |
| 2012/0114122 A1 | 5/2012 | Metivier |
| 2012/0126936 A1 | 5/2012 | Harkins et al. |
| 2012/0135680 A1 | 5/2012 | Deluca |
| 2012/0169461 A1 | 7/2012 | Dubois, Jr. |
| 2012/0213362 A1 | 8/2012 | Bliding et al. |
| 2012/0222103 A1 | 8/2012 | Bliding et al. |
| 2012/0280783 A1 | 11/2012 | Gerhardt et al. |
| 2013/0024222 A1 | 1/2013 | Dunn |
| 2013/0027177 A1 | 1/2013 | Denison |
| 2013/0099892 A1 | 4/2013 | Tucker et al. |
| 2013/0176107 A1 | 7/2013 | Dumas et al. |
| 2013/0179005 A1 | 7/2013 | Nishimoto et al. |
| 2013/0187756 A1* | 7/2013 | Fisher .................. G05B 1/00 340/5.61 |
| 2013/0214901 A1 | 8/2013 | Pineau et al. |
| 2013/0234836 A1 | 9/2013 | Davis |
| 2013/0326595 A1 | 12/2013 | Myers et al. |
| 2014/0202220 A1 | 7/2014 | Denison et al. |
| 2014/0266573 A1 | 9/2014 | Sullivan |
| 2014/0365781 A1 | 12/2014 | Dmitrienko et al. |
| 2015/0235497 A1 | 8/2015 | Voss |
| 2015/0247643 A1 | 9/2015 | Bebon et al. |
| 2015/0287256 A1 | 10/2015 | Davis |
| 2015/0348344 A1 | 12/2015 | Rettig et al. |
| 2017/0032602 A1 | 2/2017 | Cheng et al. |
| 2018/0245839 A1 | 8/2018 | Denison et al. |
| 2019/0188940 A1 | 6/2019 | Kanoria |
| 2019/0213814 A1 | 7/2019 | Han |
| 2019/0361414 A1 | 11/2019 | Davis |
| 2020/0258335 A1 | 8/2020 | Davis |
| 2020/0258378 A1 | 8/2020 | Davis |
| 2021/0256783 A1 | 8/2021 | Davis et al. |

FOREIGN PATENT DOCUMENTS

| | | |
|---|---|---|
| WO | 2004092514 A1 | 10/2004 |
| WO | 2006082526 A1 | 8/2006 |
| WO | 2008076074 A1 | 6/2008 |
| WO | 2012073265 A1 | 6/2012 |
| WO | 2012097917 A1 | 7/2012 |
| WO | 2015001009 A1 | 1/2015 |

OTHER PUBLICATIONS

Videx, Inc., "CyberAudit-Web Professional Reference Manual, Version 1.1", MN-CYA-08, Cyberlock.com, retrieved from the Internet: <URL:http://www.cyberlock.com/assets/cyberaudit-web-pro-manual.pdf>, [available on the Internet at least as early as Feb. 9, 2013].

* cited by examiner

REMOTE AUDITING OF ELECTRONIC KEYS

RELATED APPLICATIONS

This application is a continuation of U.S. patent application Ser. No. 16/865,091 entitled "Enhanced access control based on key proximity" and filed May 1, 2020, now allowed, which is a continuation of U.S. patent application Ser. No. 16/175,625 entitled "ELECTRONIC KEY DEVICE UTILIZING USER INPUT TO FACILITATE ACCESS BY AUTHORIZED PERSONS" and filed on Oct. 30, 2018, now U.S. Pat. No. 10,643,414 issued on May 5, 2020, which is a continuation of U.S. patent application Ser. No. 15/596,201 entitled "REMOTE ADMINISTRATION OF AN ELECTRONIC KEY TO FACILITATE USE BY AUTHORIZED PERSONS" and filed on May 16, 2017, now U.S. Pat. No. 10,115,256 issued on Oct. 30, 2018, which is a continuation-in-part of U.S. patent application Ser. No. 14/680,048 entitled "APPARATUS AND METHOD FOR REMOTE ADMINISTRATION AND RECURRENT UPDATING OF CREDENTIALS IN AN ACCESS CONTROL SYSTEM" and filed on Apr. 6, 2015, now U.S. Pat. No. 9,841,743 issued on Dec. 12, 2017, which claims the benefit of U.S. Provisional Pat. App. No. 61/975,911 entitled "APPARATUS AND METHODS FOR ELECTRONIC ACCESS CONTROL" and filed on Apr. 7, 2014. The disclosures of the foregoing applications are incorporated by reference herein in their entirety.

TECHNICAL FIELD

This disclosure relates to the field of access control, and, more particularly to an improved electronic key for use with an electronic lock in an access control system.

BACKGROUND INFORMATION

It has become commonplace in the broad field of access control for locks and keys to incorporate electronic components that control various aspects of the locking and unlocking process. Indeed, the automobile industry has long been familiar with keyless entry systems that utilize electronic components to control access to a vehicle.

In other areas of access control, for example securing areas of a large commercial building wherein locks are installed on doors, cabinets, and other enclosures, it is desirable to replace traditional mechanical lock cylinders in an access control system with electronic or electro-mechanical locks.

In access control systems incorporating electronic or electro-mechanical locks, it is often advantageous to provide a system administrator or system user with the ability to monitor and/or control the operation of electronic locks from a computer station, for example by connecting the electronic locks to a data network via a wireless local area network (WLAN) or a permanent hardwire connection. However, the costs associated with installing, connecting, and maintaining such a system may be prohibitive, particularly in a large or sprawling complex. Moreover, the location of certain locks may not be conducive to either form of connection. In addition to maintaining an adequate communications infrastructure, dedicated administration software is generally required to manage the access control system. This software adds additional costs to the system and computer updates or hardware changes may cause system malfunctions.

BRIEF DESCRIPTION OF THE DRAWINGS

For a more complete understanding of this disclosure, the drawings herein illustrate examples of the various non-limiting and non-exhaustive embodiments and implementations. The drawings, however, do not limit the scope of the disclosure.

DETAILED DESCRIPTION

In view of the difficulties and costs associated with facilitating the exchange and maintenance of access control information in an access control system, the present inventor recognized that there is a need for providing remote monitoring and control of information associated with portable electronic keys deployed in an access control system.

Figure 1:
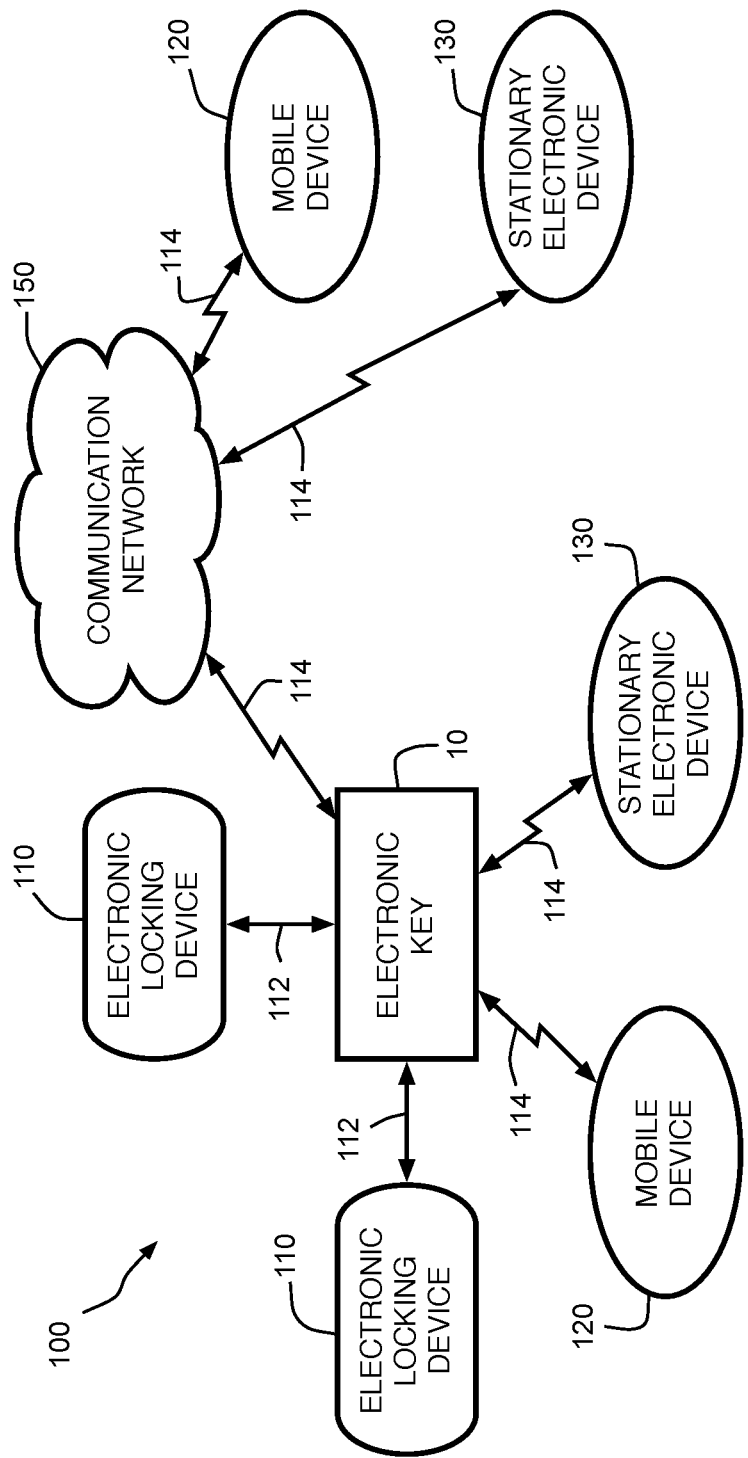
FIG. 1 is a block diagram illustrating an example access control system in accordance with various embodiments.

As illustrated generally in FIG. 1, an access control system 100 used to selectively control access to an area(s), enclosure(s), or item(s) comprises at least one electronic locking device 110. Electronic locking device 110 may be any locking device controlled, at least in part, by electrical signals and capable of selectively locking an access point, enclosure, or otherwise selectively restricting access to an area or item. Examples of various suitable electronic locking devices are described in U.S. Pat. Nos. 5,140,317, 5,351,042, and 6,474,122, to name a few. According to various embodiments described herein, a portable electronic key 10 communicates with electronic locking device 110 via a bi-directional interface 112, for example to initiate an unlocking sequence or otherwise control operation of the locking device according to known methods.

Various methods and techniques for communicating with and/or controlling operation of an electronic locking device are known in the field of electronic locks. One example of a reliable method is that described in the aforementioned '122 patent assigned to Videx, Inc., assignee of this disclosure. As illustrated in greater detail in the '122 patent, operation and/or unlocking of an electronic locking device may be initiated by transmitting information comprising a unique identification code and password, stored in memory of an electronic key, to the electronic locking device. The electronic locking device may then compare the received identification code and password against a list of authorized keys and passwords stored in memory of the electronic locking device. If the transmitting key is indeed authorized to operate the electronic locking device, and the transmitted password is accurate, the electronic locking device may thereafter be opened. It will be appreciated that other known methods and techniques for operating an electronic locking device may demand additional authentication variables that further restrict access, for example time and/or date constraints that limit the period during which a key is authorized to operate a lock. In accordance with other suitable methods and techniques, the electronic key may store a record of successful and/or unsuccessful access events in memory of the electronic key and/or the electronic locking device. As operation varies across access control systems, skilled persons will appreciate that the term "access event" refers to any event involving a component of access control system 100. Depending on the arrangement and characteristics of access control system 100, access events may include such events as successfully unlocking an electronic locking device, denying an electronic key access to an electronic locking device, movement of an electronic key to a particular area of an access control system, and transmitting certain access control information from one device to another, to illustrate just a few possible examples.

Skilled persons will appreciate that any one of the known methods and techniques of operating and communicating with a suitable electronic locking device may be employed by access control system 100. Accordingly, bi-directional interface 112 may be implemented as a wired communications link, wireless communications link, or combinations thereof utilizing any suitable communications protocols discussed herein. Methods of communicating with and/or operating an electronic locking device via a wired communications link are disclosed for example in U.S. Pat. Nos. 5,140,317 and 6,474,122 (described briefly above). Methods of communicating with and/or operating an electronic locking device via a wireless communications link are disclosed for example in U.S. Pat. Nos. 5,815,557 and 7,334,443.

It is further appreciated by skilled persons that an electronic locking device may be configured without access to a power source. In such configurations, electrical power to energize circuitry of the electronic locking device may be provided by a power source within an electronic key during an unlocking operation or during other key-to-lock communications. For example, electrical power may be supplied to circuitry of an electronic lock during engagement with an electronic key via electrical contacts (where electrical contacts on an electronic key may be electrically coupled with corresponding electrical contacts on the electronic locking device) or by other known methods such as inductive coupling.

While access control system 100 may comprise any suitable electronic locking device known to skilled persons, various embodiments of this disclosure are illustrated as comprising an electronic locking device(s) configured without access to a power source. Accordingly, bi-directional interface 112 is illustrated herein as a wired communications link (or combination of wired and wireless) implemented such that portable electronic key 10 may energize circuitry of electronic locking device 110 according to known methods. As used herein with respect to bi-directional interface 112, the term "wired communications link" indicates that physical engagement (i.e. mechanical coupling) between portable electronic key 10 and electronic locking device 110 may facilitate the energizing of circuitry within electronic locking device 110, for example via electrical contacts disposed on both key and locking device. It will be understood that the term wired communications link is not intended to denote or require a permanent wired connection between portable electronic key 10 and electronic locking device 110. In addition to energizing lock circuitry, in certain implementations bi-directional interface 112 may be further utilized to electronically transmit information such as an access credential to electronic locking device 110. However, it will be appreciated that bi-directional interface 112 may optionally be implemented according to other known methods, including for example as a wireless communications interface that may additionally accomplish energizing circuitry within electronic locking device 110 via inductive coupling or other known methods of wireless energy transfer.

Figure 2A:
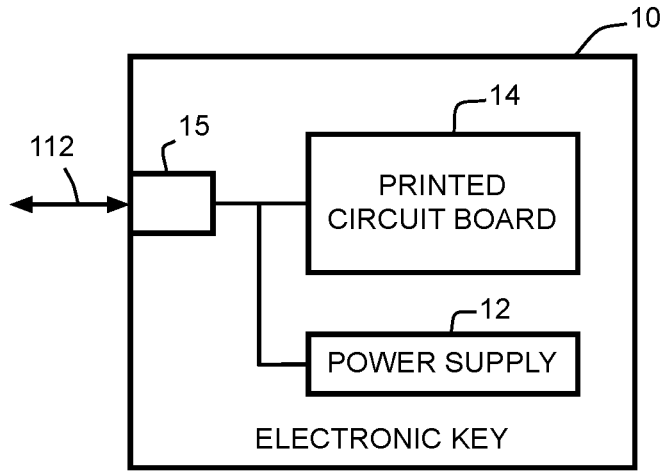
FIG. 2A is a block diagram illustrating an example portable electronic key in accordance with various embodiments.

In accordance with one or more embodiments of this disclosure, a portable electronic key for use in access control system 100 is illustrated generally at 10 in FIG. 2A. It will be understood that this disclosure also refers to "portable electronic key" as simply "electronic key" for brevity, and that the two terms may be used interchangeably. Electronic key 10 comprises a power supply 12 and a printed circuit board (PCB) 14. Optionally, power supply 12 and/or PCB 14 may be electrically coupled to one or more electrical contacts 15. Electrical contacts 15 are preferably disposed such that they are accessible from the exterior of electronic key 10. Skilled persons will appreciate that the overall mechanical and electrical arrangement of electronic key 10 may be implemented as desired.

Figure 2B:
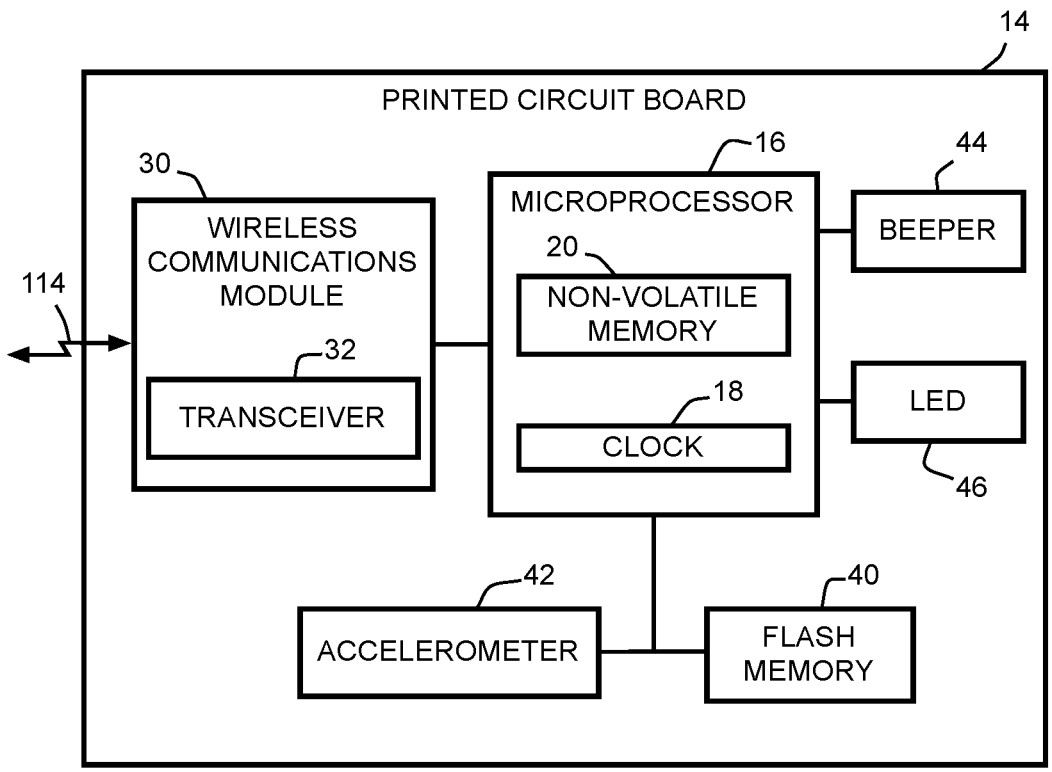
FIG. 2B is a block diagram illustrating an example printed circuit board with functional components embedded thereon for use with a portable electronic key in accordance with various embodiments.

Referring also now to FIG. 2B, PCB 14 has embedded thereon, a microprocessor 16 connected to a plurality of functional components including a wireless communications module 30 and flash memory 40. Additionally, the PCB may optionally have embedded thereon, and connected to microprocessor 16, an accelerometer 42, a beeper 44, and an LED 46. Other functional components may be embedded on PCB 14 as desired. Microprocessor 16 typically includes a clock 18 and non-volatile memory 20 embedded thereon. Wireless communications module 30 may utilize various known methods and protocols of wireless communication including IEEE 802.11x, WI-FI DIRECT®, BLUETOOTH®, ZIGBEE®, NFC, and/or other wireless communication methods and protocols known to skilled persons.

Wireless communications module 30 is shown in FIG. 2B as comprising an embedded transceiver 32, but it will be understood that a transceiver or antenna may be provided in non-embedded configurations and operably connected thereto. It will further be understood that a plurality of wireless communications modules may be included to provide electronic key 10 with wireless communications capabilities utilizing multiple methods and protocols. Appropriate wireless communications modules may be obtained commercially and include that sold under the model number "MRF24WB0MA" by Microchip Technology of Chandler, Ariz. It will be appreciated by skilled persons that other suitable wireless communication circuitry may have utility in electronic key 10.

In addition to non-volatile memory 20 embedded on microprocessor 16, flash memory 40 of PCB 14 may be commercially available flash memory and according to some embodiments is configured to store access control information, such as an audit trail (i.e. log of previous access events, such as details associated with opening of a locking device), access credential (e.g. key permissions, lock schedules, other variables, etc.), and other access control information utilized in the implementation of various embodiments of access control system 100. While electronic key 10 is described herein as containing a plurality of separate memory units (non-volatile memory 20 embedded on microprocessor 16 and flash memory 40), it will be understood that electronic key 10 may utilize any appropriate arrangement of electronic memory sites to store information including a single non-volatile memory unit.

Accelerometer 42 may be any device capable of measuring acceleration forces and may for example comprise a multi-axis accelerometer or alternatively, acceleration forces may be measured by a combination of multiple, single-axis accelerometers. Beeper 44 may be any audio signaling device such as a piezoelectric buzzer and/or other audio signaling devices known to skilled persons. Although FIG. 2B depicts the aforementioned functional components as embedded on PCB 14 and coupled to microprocessor 16, skilled persons will appreciate that in alternate embodiments and implementations, these components may be arranged separately from PCB 14 and operably associated with microprocessor 16 utilizing known methods.

Figure 3:
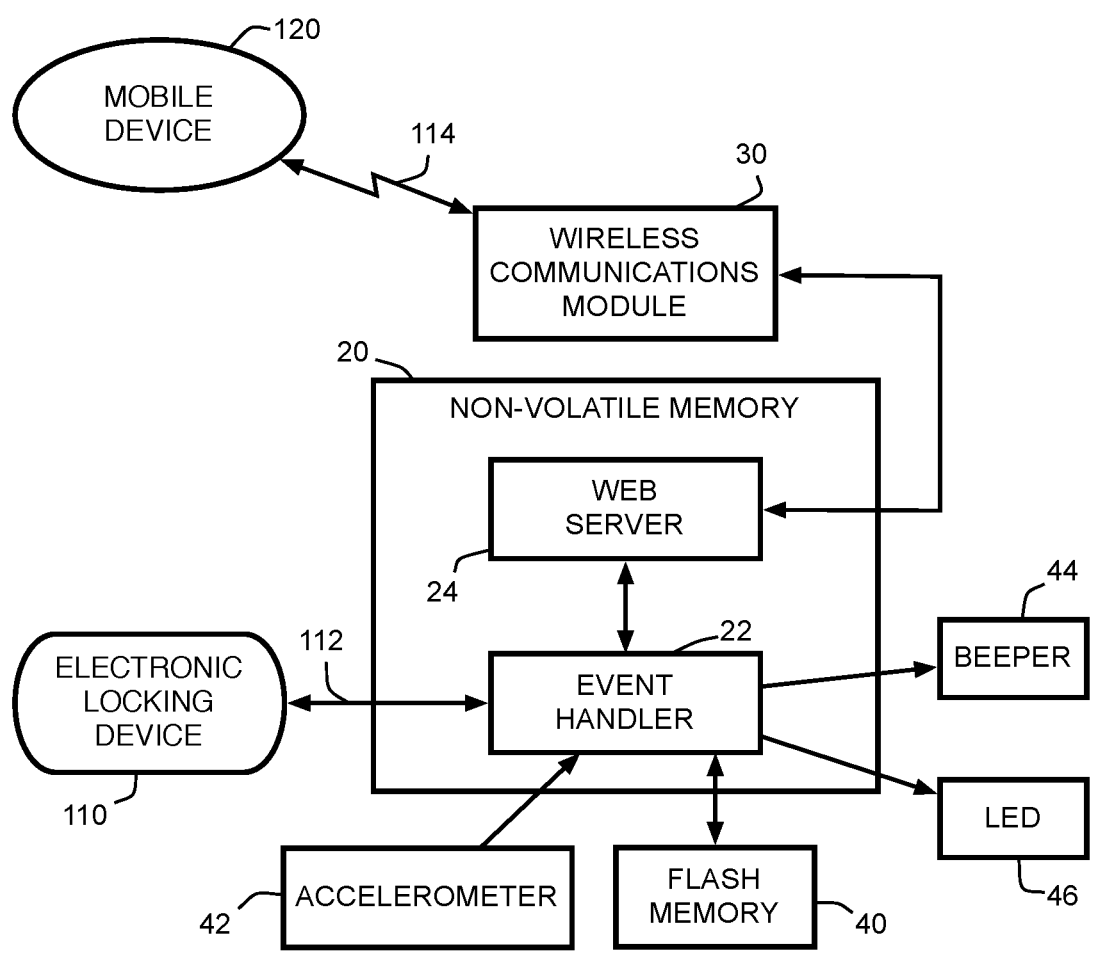
FIG. 3 is a block diagram illustrating an example of communication interfaces between functional components of a portable electronic key and further illustrating example communication interfaces between the portable electronic key and electronic devices located away from the key.

Referring to FIG. 3, non-volatile memory 20 (embedded on microprocessor 16) comprises a software application(s) containing an event handler 22 and a web server 24. While event handler 22 and web server 24 are illustrated as being disposed on the same memory unit, skilled persons will appreciate that event handler 22 and/or web server 24 may be disposed on separate memory units such as flash memory 40. Further, while event handler 22 and web server 24 are illustrated herein as separate software programs, skilled persons will appreciate that this arrangement is illustrative only and that a single software program, or many separate programs, may be configured to perform the various functions of event handler 22 and web server 24. Event handler 22 may be a software program configured to receive, process, and respond to input signals from functional components operably associated with microprocessor 16 such as accelerometer 42. Further, event handler 22 may be configured to receive, process, and respond to input signals from bi-directional interface 112 for example when electronic key 10 is engaged with electronic locking device 110 or with a recharging dock (not shown).

In accordance with some implementations, event handler 22 may respond to various forms of input by selectively controlling access to information stored on electronic key 10, for example in flash memory 40. By way of example, event handler 22 may respond to an engagement event with an electronic locking device 110 by performing an authentication action as described in this disclosure (e.g. by comparing unique ID codes of both key and lock, etc.). As used herein, the term "engagement event" refers to electronic key 10 engaging, pairing, or otherwise communicating with electronic locking device 110 (e.g. for the purpose of initiating an unlocking sequence or exchanging information). In this example, if event handler 22 determines that electronic key 10 is indeed authorized to operate electronic locking device 110, event handler 22 may initiate an unlocking sequence according to known methods as described briefly herein. For instance, in this implementation event handler 22 may retrieve an access credential, such as a unique key ID code and password, stored in flash memory 40 and transmit this information to electronic locking device 110 via bi-directional interface 112. It will be appreciated that the term "access credential" refers to any information that may be utilized by electronic locking device 110 and/or electronic key 10 to authenticate access or operation and may include information such as authorized time and date schedules (i.e. permissions to access certain electronic locking devices at certain times), passwords, ID numbers, etc.

For example, while electronic locking device 110 may require electronic key 10 to possess the proper permissions (i.e. authorization) to initiate an unlocking sequence of that particular locking device, it may require additional information, such as a date/time variable that is compared against a date/time range during which the electronic key 10 is authorized to operate electronic locking device 110. In this example, the access credential may comprise information including the permission to operate the electronic locking device 110 (i.e. electronic key 10 may store a list of electronic locking devices it is authorized to open) as well as the attempted time of operation. In other examples, the access credential may comprise only the access permission. In yet other examples, the access credential may comprise the access permission and information associated with the most recent access event recorded by electronic key 10. Electronic locking device 110 may subsequently compare (e.g. utilizing a microprocessor) the access credential transmitted by electronic key 10 with a list of authorized access credentials, such as key ID codes and passwords, stored in memory of the lock. Upon proper authorization, electronic locking device 110 may perform an unlocking operation, for example by utilizing a solenoid or electric motor therein to displace a lock pin or blocking member.

While authentication and operation of electronic locking device 110 is illustrated herein as comprising an exchange and comparison of an access credential (e.g. ID code, password, and/or time of operation), it will be appreciated by skilled persons that event handler 22 may utilize any known method or technique to operate and/or unlock electronic locking device 110. Alternatively, if event handler 22 determines that electronic key 10 is not authorized to operate the engaged electronic locking device 110 it may alert the user of the key (and potentially persons nearby), that the attempted operation is not authorized, for example by actuating beeper 44 and/or LED 46.

In accordance with alternative implementations, event handler 22 may utilize signals from accelerometer 42 to control, or otherwise alter, communications with electronic locking device 110. To illustrate, upon engagement with electronic locking device 110, event handler 22 may initiate an unlocking sequence (as described herein) if signals produced by accelerometer 42 indicate that electronic key 10 was subjected to a force(s) exceeding a predetermined threshold. In other examples, event handler 22 may initiate an unlocking sequence if signals produced by accelerometer 42 indicate that electronic key 10 was recently subjected to a series of forces matching a particular pattern.

To illustrate further, event handler 22 may be configured in a default state such that it will perform no action in response to an engagement event. As described above, event handler 22 may typically respond to an engagement event by transmitting an access credential to electronic locking device 110 or otherwise initiating an unlocking sequence with electronic locking device 110. However, in this present example, a user of electronic key 10 may first need to subject the key to a particular force(s), movement(s), or orientation such that signals produced by accelerometer 42 will cause event handler 22 to perform an action or otherwise respond to an engagement event.

For instance, event handler 22 may be configured to respond to an engagement event (e.g. by transmitting an access credential or otherwise initiating operation and/or opening of an electronic lock) for a limited period of time after signals produced by accelerometer 42 indicate a particular force typically registered when electronic key 10 is tapped against a hard surface. In this example, tapping electronic key 10 against a solid surface may enable event handler 22 to respond to engagement events (i.e. communicate with electronic locking device 110) for a limited period of time, such as 30 seconds. While tapping the key against a hard surface is one illustration of a particular measurable force, skilled persons will appreciate that any distinguishable force, or pattern of forces, may be utilized to selectively enable response to engagement events, for example a series of taps or a unique vibration sequence. Skilled persons will further appreciate that enabling event handler 22 for limited periods of time in response to signals from accelerometer 42 is an example illustrating but one method or technique of utilizing signals produced by accelerometer 42 to further control access permissions and event handler 22 may utilize other methods and techniques. In alternative implementations, signals produced by accelerometer 42 may be recorded or logged to a file stored in flash memory 40 or other memory of electronic key 10. During an engagement event, event handler 22 may initially search the file(s) containing recorded accelerometer events to determine whether a particular force, or pattern of forces, was recently recorded, for example within the previous 30 seconds. If the particular enabling force is indeed present in the log of accelerometer events, event handler 22 may thereafter proceed to initiate an unlocking sequence with electronic locking device 110.

In yet further implementations, event handler 22 may disable an otherwise typical default response to engagement events when particular signals are produced by accelerometer 42. Here, event handler 22 may be configured such that it does not perform any action in response to engagement events for a limited period of time after signals produced by accelerometer 42 indicate electronic key 10 was subjected to a particular force or series of forces. In various implementations, event handler 22 may be configured in a default state such that it responds to engagement events by exchanging an access credential or otherwise initiating an unlocking sequence with electronic locking device 110. When event handler 22 receives a signal(s) produced by accelerometer 42 indicative of a particular force or series of forces (e.g. exceeding a predetermined threshold), event handler 22 may deviate from this default state by disabling all responses to engagement events for a period of time, such as 10 minutes.

In this manner, event handler 22 may temporarily disable the access capabilities of electronic key 10 if signals produced by accelerometer 42 indicate that electronic key 10 may have been forcibly taken from its user, for example during a physical altercation. It will be appreciated that other forces or patterns of forces may cause event handler 22 to disable functionality and selection of a particular force or pattern of forces may be subjective and/or may be based, for example, upon physical and environmental forces customarily experienced by electronic key 10 in a particular access control system 100.

In accordance with various implementations, event handler 22 may control and/or communicate with various functional components of electronic key 10 in response to a signal(s) produced by accelerometer 42. For instance, power consumption of electronic key 10 may be reduced by configuring event handler 22 to enable wireless communications module 30 (or other functional components) in response to signals produced by accelerometer 42 indicating movement of electronic key 10. In this manner, power consumption of electronic key 10 may be reduced during periods of time when it is stationary and thus unlikely to be used. Here, wireless communications module 30 may be connected to microprocessor 16 via a serial peripheral interface (SPI) bus with a slave select line or other known method to allow selective enabling/disabling of connected peripherals. To reduce power usage, wireless communications module 30 may be disabled in a default state such that it consumes reduced power or zero power until enabled (e.g. it may be disabled by holding the slave select line high in an active low configuration to interrupt delivery of electrical power to wireless communications module 30). Event handler 22 may thereafter selectively enable wireless communications module 30 by dropping the slave select line (i.e. from logic 1 to logic 0) to deliver electrical power to wireless communications module 30 in response to particular conditions. For example, in some implementations event handler 22 may enable wireless communications module 30 in response to a signal produced by accelerometer 42 indicating movement of electronic key 10. While enabling/disabling of wireless communications module 30 is described herein using a logic gate, it will be appreciated by skilled persons that other known methods and techniques may be used such as an electronic switch or electro-mechanical switch physically manipulated by the user of electronic key 10. It will be further appreciated that similar methods and techniques may be utilized to interrupt the supply of electrical power to other functional components of electronic key 10 in order to reduce overall power consumption.

In an alternative implementation, power consumption may be reduced further yet by configuring event handler 22 to selectively enable wireless communications module 30 in response to a signal produced by accelerometer 42 indicating electronic key 10 was subjected to a force exceeding a predetermined threshold. Here, event handler 22 may, for example, enable wireless communications module 30 for a predetermined period of time after receiving a signal(s) produced by accelerometer 42 indicative of a force equivalent or greater to a force typically registered when electronic key 10 is tapped or knocked against a solid surface (i.e. tapping electronic key 10 against a desk may "wake up" wireless communications module 30 and allow establishment of a wireless communications link with other electronic devices).

Referring to FIGS. 1 and 3, in accordance with various embodiments electronic key 10 may establish a wireless communications link with electronic devices by way of wireless communications module 30. To illustrate, as depicted in FIG. 1, electronic key 10 communicates with mobile device 120 and/or stationary electronic device 130 via a wireless interface 114, for example to facilitate administration of electronic key 10 or access control system 100 via mobile device 120 and/or stationary electronic device 130. Wireless interface 114 may utilize known wireless communications methods and protocols including 802.11x, WI-FI DIRECT®, BLUETOOTH®, ZIGBEE®, NFC, Z-WAVE®, DECT, RUBEE® and/or other wireless communication protocols known to skilled persons. Mobile device 120 may be a conventional cell phone, such as that typically carried by most users, laptop, computer tablet, netbook computer, wearable computer device, or any mobile electronic device capable of communicating via the communication protocols utilized by access control system 100. Likewise, stationary electronic device 130 may be a conventional desktop computer, terminal, wall panel, kiosk, or other fixed or semi-permanent electronic device capable of communicating via the methods and protocols utilized by access control system 100. The number and ratio of devices (e.g. electronic key 10, electronic locking device 110, mobile device 120, stationary electronic device 130, etc.) depicted in FIG. 1 is intended for illustrative purposes only and is not intended to limit the implementation or arrangement of access control system 100.

In some implementations, communications between electronic key 10 and mobile device 120 and/or stationary electronic device 130 may be facilitated by implementing wireless interface 114 over an ad hoc Internet Protocol (IP) WLAN, for example by employing known zero-configuration networking (ZeroConf) protocols. Alternatively, wireless interface 114 may be implemented over an IP WLAN by executing a set of instructions to configure the network settings, by manually configuring a DHCP server and DNS server, or by utilizing other known methods to distribute IP addresses, resolve domain names, and otherwise configure network settings. In this manner, wireless communications module 30 may be utilized to implement an IP WLAN to facilitate communications between electronic key 10 and one or more proximate (effective range will depend on the protocol) electronic devices without reliance on peripheral third party communications infrastructure. Indeed, in this implementation wireless interface 114 may facilitate transmission of information between electronic key 10 and an electronic device utilizing only wireless communications module 30 of electronic key 10 and compatible communications circuitry of mobile device and/or stationary electronic device 130.

While wireless interface 114 is illustrated above as being established over an ad hoc IP WLAN connecting two or more proximate devices, it will be appreciated by skilled persons that other known configurations for establishing a wireless communications link between two or more electronic devices may be utilized, such as a wireless personal area network (WPAN), a wireless wide area network (WWAN), a wireless mesh network, and/or secure device pairing. It will be further appreciated that information in the selected configuration may be transmitted utilizing any known wireless communications protocols such as WI-FI DIRECT®, BLUETOOTH®, ZIGBEE®, NFC, Z-WAVE®, RUBEE®, WiMax (IEEE 802.16) and/or other methods and protocols known to skilled persons. It will be appreciated that communications between electronic key 10 and other devices (via wireless interface 114 or other methods) may optionally be encrypted according to known methods to provide enhanced security.

In other implementations, electronic key 10 may communicate with mobile device 120 and/or stationary electronic device 130 via a communication network 150. Communication network 150 may be any conventional communications network such as a WLAN utilizing protocols such as 802.11x, well known cellular networks utilizing protocols conforming to the $3^{rd}$ Generation Partnership Project (3GPP) specifications (e.g. GSM, UMTS, LTE), CDMA2000, or other wireless communications networks known to skilled persons. In this implementation, wireless interface 114 may be established between electronic key 10 and other devices via communication network 150 such that electronic key 10 may exchange information with any mobile device 120 or stationary electronic device 130 that is similarly communicating across communication network 150, for example devices connected to a company intranet through one or more local area networks. It will be appreciated that mobile device 120 and/or stationary electronic device 130 may communicate via communication network 150 by utilizing wired methods, wireless methods, or a combination thereof. Further, communication network 150 may further be connected to the Internet via an Internet service provider (ISP) according to known methods such that electronic key 10 may exchange information with any mobile device 120 or stationary electronic device 130 that is capable of communicating across the Internet. It will be appreciated by skilled persons that electronic key 10, mobile device 120, stationary electronic device 130, and other electronic devices associated with access control system 100 may utilize various networking devices to facilitate communication and exchange of information, such as a wireless access point, a router, a gateway, a switch, a bridge, a hub, a repeater, a firewall, a multiplexer, and a modem to name a few examples. It will be further appreciated that such networking devices may be embedded on the various electronic devices associated with access control system 100 (e.g. embedded on mobile device 120 and stationary electronic device 130), or may alternatively be located remote from such electronic devices and operably associated thereto utilizing the methods and protocols described herein.

Referring again to FIG. 3, in accordance with numerous embodiments web server 24 is a software program configured to receive and respond to electronic data requests, such as HTTP requests (or data requests using other application protocols known to skilled persons) from a conventional web browser. Other protocols that may have utility for sending and responding to requests in this and other embodiments are those protocols in accordance with layer 7 of the International Organization for Standardization's Open Systems Interconnection (OSI) model. Skilled persons will appreciate that the request portion and response portion of an HTTP request-response transaction may be referred to as messages. HTTP is used herein to refer collectively to HTTP as well as its secure format, HTTPS. For example, a system user or system administrator may utilize a conventional web browser running on mobile device 120 or stationary electronic device 130 to transmit an HTTP request message to electronic key 10 via the communication methods and protocols described herein. The web browser may be any commercially available web browser capable of transmitting HTTP requests or other data requests over the Internet such as that distributed under the name "CHROME" by Google, Inc. of Mountain View, Calif, or under the trademark FIREFOX® by Mozilla Corporation also of Mountain View, Calif. While this disclosure refers to the use of a conventional web browser to illustrate various embodiments and implementations, skilled persons will appreciate that other client applications (e.g. custom proprietary applications) may be used to send electronic data request messages to web server 24.

Likewise, web server 24 may be obtained commercially and appropriate examples include that distributed under the name "Apache HTTP Server" by the Apache Software Foundation of Forest Hill, Md. Alternatively, web server 24 may be a proprietary application configured to receive and respond to electronic data requests such as HTTP request messages. Skilled persons will appreciate that software programs configured to receive and respond to electronic data requests may often be configured to operate as both a client (to generate and send electronic data request messages) and as a server (to receive and respond to electronic data request messages) in a client-server relationship with another application. Electronic key 10 is illustrated in various embodiments as having a web server 24, but it should be understood that the term "web server" is used herein for brevity and web server 24 may be any software program configured to operate as a client, as a server, or a combination thereof. Web server 24 may cooperate with event handler 22 to process (and alternatively, to generate) data request messages. In some implementations, event handler 22 may process a data request and prepare a response message for return to web server 24 utilizing information stored in flash memory 40 and/or non-volatile memory 20.

To illustrate by way of example, a system administrator may send an HTTP request message from a conventional web browser running on mobile device 120 to electronic key 10 via wireless interface 114. The HTTP request message may, for example, comprise instructions requesting audit trail information (i.e. details of previous access events) of electronic key 10, or audit trail information corresponding to all keys deployed in access control system 100. Web server 24 handles the data request and communicates the information contained in the request message to event handler 22 to prepare a response message for transmission to the web browser on mobile device 120. In some implementations, event handler 22 may initially authenticate the administrator (or other user initiating the HTTP request) prior to preparing a response message, for example utilizing digest access authentication or other known challenge-response protocols.

To illustrate further, when processing the HTTP request, event handler 22 may first determine whether the requested audit trail information exists in memory 40 and/or non-volatile memory 20. Optionally, event handler 22 may communicate with an embedded database server (not shown) or other file management program where files stored on electronic key 10 are organized according to such architectures. If event handler 22 determines that the requested audit trail information does not exist on electronic key 10, the event handler may prepare an error message for return to web server 24 which in turn transmits this error message to the web browser, for example as an HTML page or other browser compatible text format. Alternatively, if the requested audit trail information does indeed exist in memory, event handler 22 may pass this information directly to the web browser via web server 24 (e.g. if the requested information is stored on electronic key 10 in a static HTML document). In another implementation, event handler 22 may prepare a dynamic HTML web page containing the requested audit trail information for return to web server 24 utilizing known methods and techniques such as server-side scripting. Further, event handler 22 may cache dynamic web pages to reduce load times when responding to subsequent requests.

In yet another implementation, event handler 22 may prepare responses in XML, JSON, or other known formats suitable for transmitting information between server and client. For instance, known web development techniques such as Asynchronous Javascript and XML (AJAX) may be utilized in the implementation of a web application (or interactive webpage) providing a user friendly graphical user interface (GUI) displaying access control system information and details on the web browser. In this manner, a user of the web browser is able to perform administration duties for an access control system using the interface provided on the web browser. Here, event handler 22 may initially respond to an HTTP request message by preparing a response message containing static resources utilized by the web browser to build or assemble a web application. These static resources may comprise a file(s) containing various languages and formats capable of being handled by a conventional web browser such as HTML, JAVASCRIPT®, CSS, etc. After the web browser utilizes these static resources to build a web application, additional asynchronous (or background) HTTP request messages may be generated and sent automatically from the web browser to update information displayed at the web application, preferably without reloading the page or application. For instance, after initially displaying audit trail information for a particular electronic key 10 at the web application, additional asynchronous HTTP request messages may be sent to electronic key 10 such that any change to the audit trail of the key would thereafter be transmitted to the web browser to automatically update the audit trail information displayed at the web application, preferably without reloading or modifying the other resources displayed. In this implementation, event handler 22 may prepare a response (to asynchronous HTTP request messages) containing the requested audit trail information in JSON, XML, or other known textual data formats.

In further implementations, event handler 22 may create, modify, copy, replace or delete files stored in flash memory 40 or non-volatile memory 20 in response to an HTTP request message. To illustrate, in an emergency situation a system administrator may send an HTTP request message from a web browser on mobile device 120 to electronic key 10 containing instructions to delete or otherwise disable the access credential(s) for that particular electronic key. In response, event handler 22 may delete the file(s) containing the access credential from flash memory 40 before returning a response message comprising an HTML page to web server 24 (for transmission to the web browser) indicating that the requested action was performed successfully. In this example where an access credential was deleted, the system administrator may reprogram or otherwise provide new access permissions and/or other access credential information to electronic key 10 in order to thereafter operate electronic locking device 110.

In another aspect, a system administrator may replace an obsolete file(s) stored on electronic key 10 by utilizing a web browser or other client program to transmit an updated version of the file(s) along with an HTTP request message containing instructions to replace the obsolete file(s), stored in flash memory 40 or non-volatile memory 20, with the transmitted file. In response, event handler 22 may initiate a replacement of the obsolete file and return an HTML page (or other data) to web server 24 indicating the requested replacement was performed successfully.

In a further example, a system administrator running a web application on a conventional web browser may send an HTTP request message to electronic key 10 containing a request to retrieve, for display, the access credential for that particular electronic key. After loading the credential information (as transmitted by electronic key 10) at the web application, the web application may provide the system administrator with the ability to adjust the access credential, for example by modifying the times during each day that electronic key 10 is authorized for use by a particular user. If the system administrator modifies the authorized time frame, for example by clicking on button(s) or moving sliders within the web application's GUI to increase or decrease the authorized time frame, the web browser may send asynchronous request messages to web server 24 containing instructions to modify the access credential accordingly. In this example, event handler 22 may respond by modifying the file(s) containing the access credential for electronic key 10 stored, for example, in flash memory 40 before returning an XML or JSON file containing the modified access credential information. The web application running on the system administrator's web browser may process the XML or JSON file and appropriately update the page resources (which may be comprised of a combination of web browser compatible languages and protocols including, for example, HTML, JAVASCRIPT®, CSS, etc.) in real-time such that the system administrator may view the newly modified credential, preferably without reloading the web application or otherwise interrupting display of page resources.

According to some implementations, event handler 22 may communicate with and/or control functional components of electronic key 10 in response to messages received at the key. For example, event handler 22 may initiate an alarm by actuating beeper 44 and/or LED 46 before returning a response message to web server 24. In another example, event handler 22 may conserve power by disabling wireless communications module 30 immediately after web server 24 successfully returns a response message to the web browser. In yet other examples, event handler 22 may communicate with and/or control functional components of electronic key 10 without preparing any response message to return to the web browser.

Figure 4:
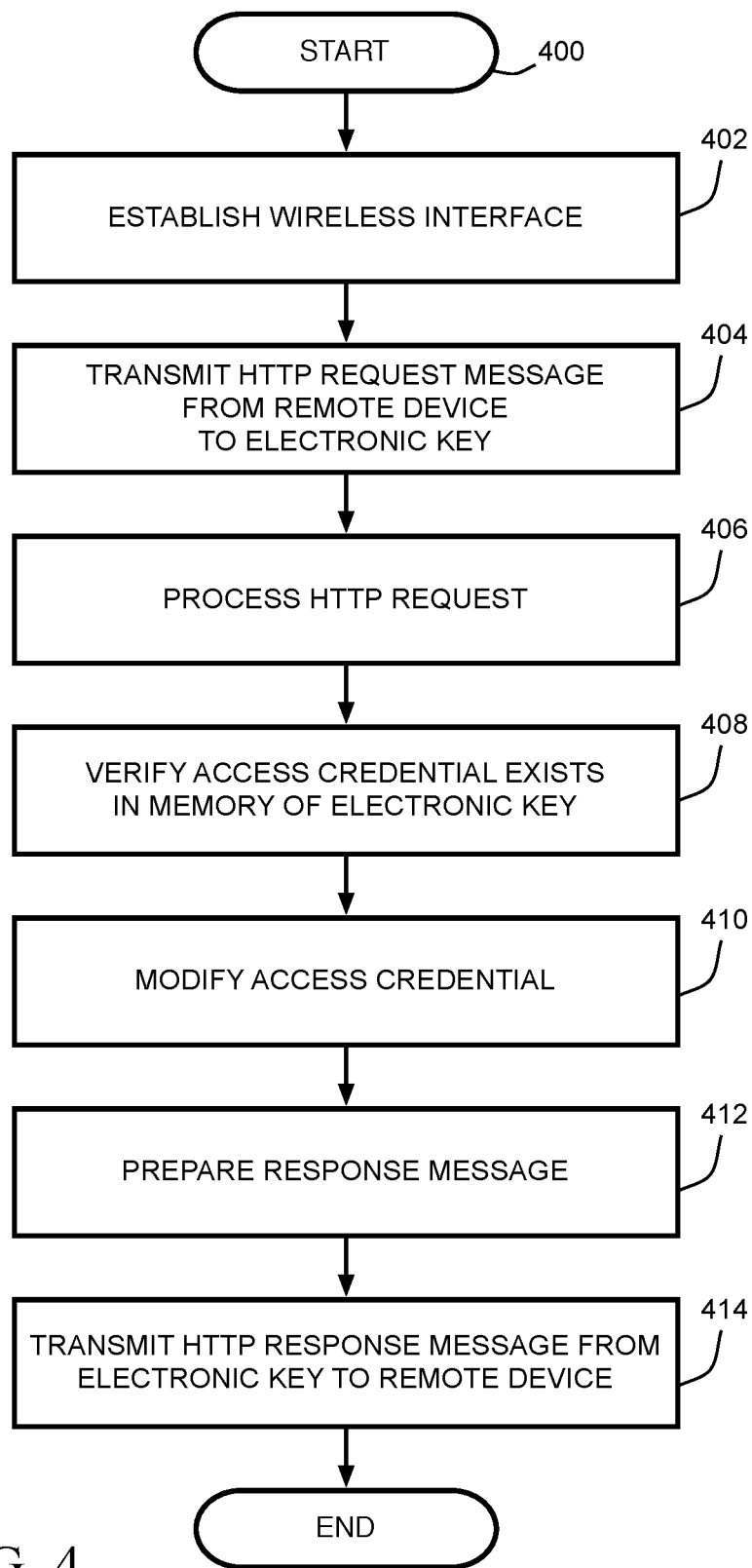
FIG. 4 is a flowchart illustrating an example method for utilizing a conventional web browser on an electronic device to modify access control information of a portable electronic key.

Referring here to FIG. 4, a method for modifying access credential information of an electronic key 10 deployed in access control system 100 will be described in accordance with at least some embodiments. The process begins at step 400 and proceeds to step 402 where wireless interface 114 is established between electronic key 10 and mobile device 120. At step 404, an HTTP request message containing instructions to modify access credential information for electronic key 10 is transmitted from a web browser running on mobile device 120 to electronic key 10 via wireless interface 114. Web server 24 processes the HTTP request message and communicates the information contained therein to event handler 22 at step 406. In step 408, event handler 22 may first verify that a file(s) containing a valid access credential exists in flash memory 40. If such a file(s) exists in memory, event handler 22 may proceed to step 410 where the access credential is modified in accordance with instructions contained in the received HTTP request message. At step 412, notwithstanding whether the access credential was actually modified, event handler 22 prepares a response message to pass to web server 24. Here, the response may, for example, be an HTML, file containing the access credential as modified in step 410. Alternatively, the response may be a file containing an error message where the requested modification of the access credential was unsuccessful. At step 414, event handler 22 passes the prepared response message to web server 24, which subsequently transmits the response message, via wireless interface 114, to the web browser running on mobile device 120.

Power consumption during communications between electronic key 10 and various electronic devices may be reduced by configuring event handler 22 to disable wireless communications module 30 where wireless interface 114 is not established within a predetermined period of time after the module has been enabled (i.e. if a device has not established a communications link, or attempted to establish a communications link, with electronic key 10). In other embodiments, power consumption of electronic key 10 may be reduced by configuring functional components in a default low power or sleep state and thereafter selectively enabling said components in response to a signal(s) from accelerometer 42. For instance, a user of electronic key 10 may need to subject electronic key 10 to a particular force or pattern of forces in order to activate functional components, such as wireless communications module 30. In this manner, a user of electronic key 10 may actively conserve power by enabling functional components only when needed, for example immediately before or shortly after attempting an engagement event.

Figure 5:
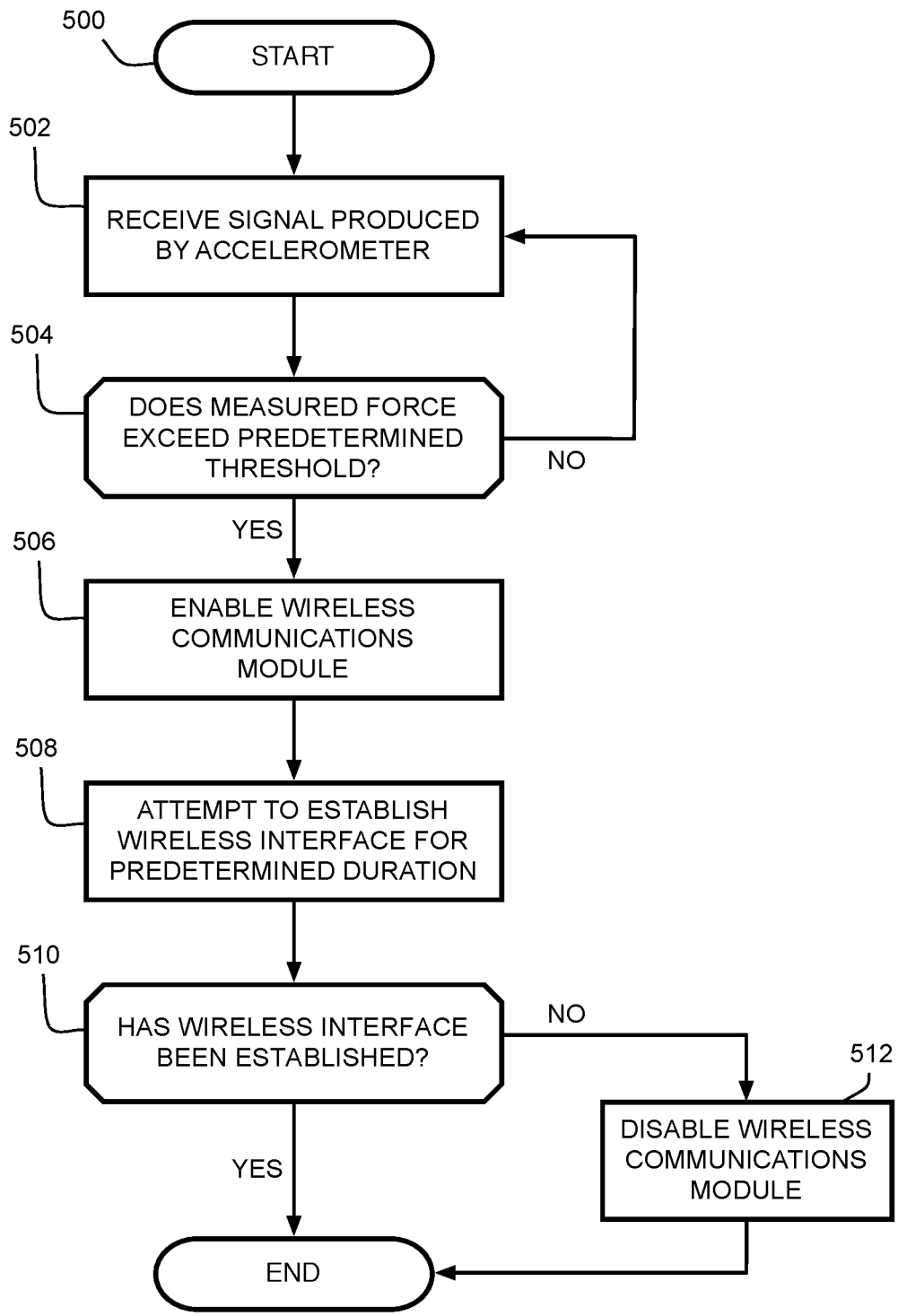
FIG. 5 is a flowchart illustrating an example of an energy efficient method for establishing a wireless communications interface with a portable electronic key.

Referring now to FIG. 5, an energy efficient method for establishing a wireless communications link with an electronic key will be described in accordance with at least some embodiments. The method is initiated at step 500 and proceeds to step 502 where event handler 22 receives a signal(s) produced by accelerometer 42 and determines what forces, if any, electronic key 10 has been subjected to. If event handler 22 determines that signals produced by accelerometer 42 indicate that forces acting on electronic key 10 exceed a predetermined threshold in step 504, the method proceeds to step 506 where event handler 22 enables wireless communications module 30. For example, in some implementations the predetermined threshold may be established, in part, based on forces typically registered when electronic key 10 is subjected to a tapping or knocking against a solid surface such as a desk. However, if event handler 22 determines that forces acting on electronic key 10 have not exceeded a predetermined threshold, step 502 is repeated indefinitely until event handler 22 determines that forces acting on electronic key 10 have exceeded a predetermined threshold. After wireless communications module 30 has been enabled, event handler 22 thereafter attempts (or responds to attempts generated by other electronic devices) to establish wireless interface 114 with other devices associated with access control system 100 for a predetermined period of time in step 508. In this step 508, event handler 22 may for example respond to a request from a compatible communications module on mobile device 120 by attempting to establish wireless interface 114 via wireless communications module 30. In other examples of step 508, event handler 22 may attempt to connect to a WLAN using network credentials stored in flash memory 40. After expiration of the predetermined time in step 508, the method proceeds to step 510 where event handler 22 determines whether wireless interface 114 has been established between electronic key 10 (via wireless communications module 30) and another device or communication network 150. If event handler 22 determines that wireless interface 114 has not been established, event handler 22 disables wireless communications module 30 in step 512. Skilled persons will appreciate that similar methods may be used to conserve power consumption or control behavior of other functional components. For instance, event handler 22 may only initiate an engagement event with electronic locking device 110 after event handler 22 determines that signals produced by accelerometer 42 indicate electronic key 10 was subject to a force exceeding a predetermined threshold.

Figure 6:
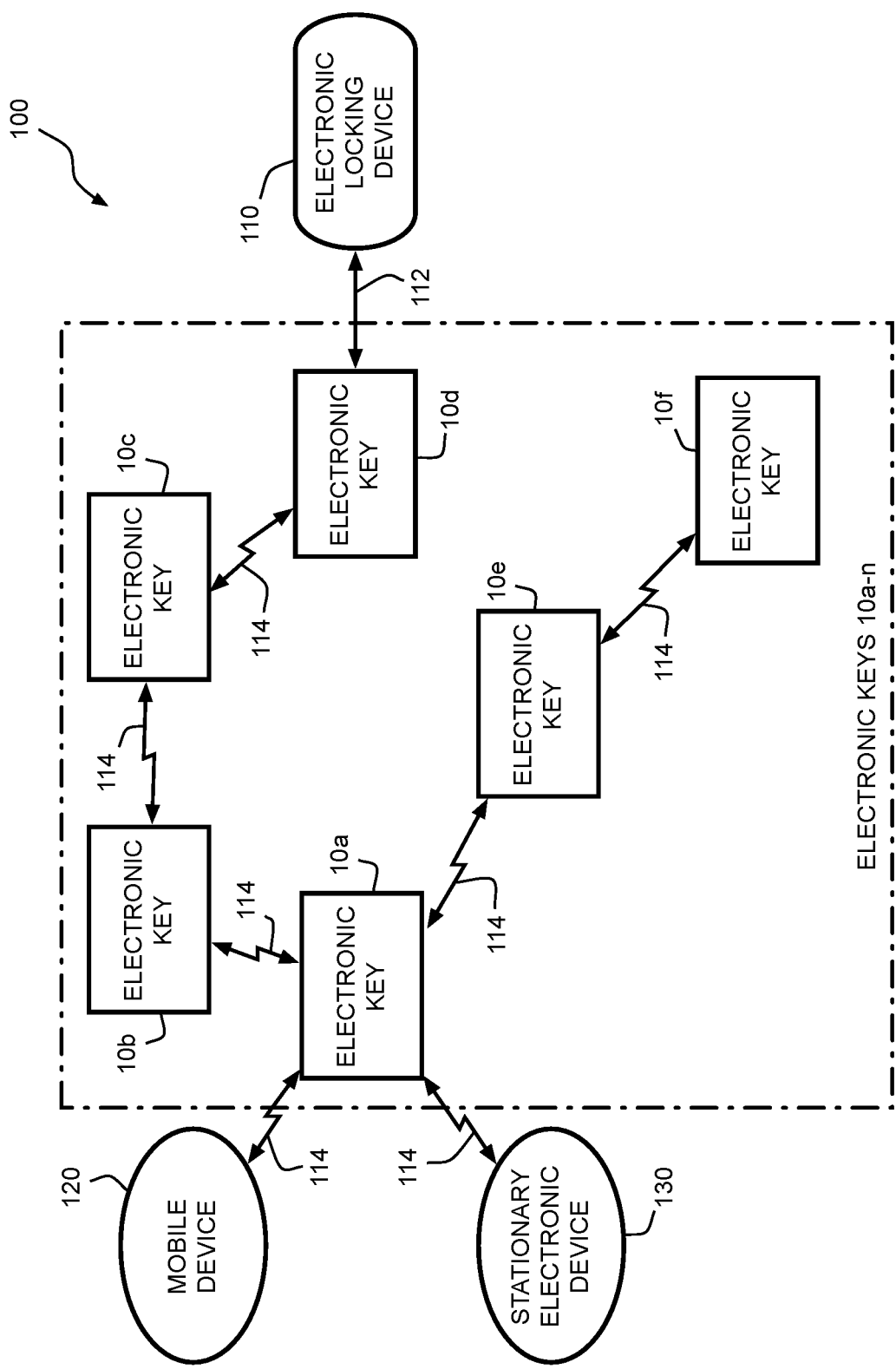
FIG. 6 is a block diagram illustrating example communications between a set of two or more portable electronic keys deployed in an access control system.

Turning now to FIG. 6, in accordance with various embodiments, a set comprising two or more electronic keys $10_{a-n}$ deployed in access control system 100 may establish a wireless communications link with one another via wireless communications module 30. In this manner, each electronic key 10 may effectively operate as a proxy administrator or master key by passively updating other keys (e.g. by modifying an access credential with new permissions). For example, in an illustrative access control system 100, each individual electronic key $10_{a-n}$ may initially have stored thereon (e.g. in flash memory 40) a file(s) comprising an identical access credential, or set of credentials, applicable to all electronic keys $10_{a-n}$ in access control system 100. The system administrator, wishing to update access permissions for a particular individual electronic key (e.g. $10_d$) may conveniently establish a wireless communications link between an electronic device and any available electronic key $10_{a-n}$ in the system (according to methods described herein). For example, the system administrator may establish wireless interface 114 between mobile device 120 and electronic key $10_a$ and subsequently update the access credential corresponding to a different electronic key, such as $10_d$, stored thereon. Updating of the access credential may be accomplished according to the various methods and techniques described herein, such as for example sending an HTTP request message containing instructions to modify the permissions for a particular key.

The file(s) containing the newly updated access permissions, now stored on electronic key $10_a$, may further contain a time stamp or other appropriate variable to indicate the time and date that the file(s) was modified. Subsequently, when an administrator or user transports updated electronic key $10_a$ throughout access control system 100, event handler 22 of electronic key $10_a$ may selectively enable wireless communications module 30 and thereafter attempt to establish wireless interface 114 with one or more electronic keys $10_{a-n}$.

As with wireless communications between electronic key 10 and mobile device 120 and/or stationary electronic device 130, implementation of wireless interface 114 between two or more electronic keys $10_{a-n}$ may utilize any appropriate wireless communications protocols such as 802.11x, WI-FI DIRECT®, BLUETOOTH®, ZIGBEE®, NFC, Z-WAVE®, RUBEE®, and/or other methods and protocols known to skilled persons. Further, information may be exchanged between keys in formats identical or equivalent to those utilized when communicating with a web browser or other application on mobile device 120 and/or stationary electronic device 130. For instance, electronic key 10 may request information from other electronic keys $10_{a-n}$ by transmitting, via wireless interface 114, an HTTP request message (or other electronic data requests known to skilled persons). An electronic key 10 receiving an HTTP request message may thereafter respond by transmitting information (e.g. response messages) via wireless interface 114 to other electronic keys $10_{a-n}$ utilizing XML, JSON, HTML or other known textual data protocols.

Upon establishment of wireless interface 114 between two or more electronic keys, for example between electronic key $10_a$ and electronic key $10_b$, event handler 22 (on either key) may initiate an information exchange between the keys. For example, event handler 22 on electronic key $10_a$ may update the access credential stored on electronic key $10_b$ by first requesting (e.g. transmitting an HTTP request message via web server 24) wirelessly connected electronic key $10_b$ transmit its access credential file(s). Event handler 22 on electronic key $10_b$ may respond by transmitting the file(s) via web server 24 and wireless interface 114. Upon receipt of the access credential file(s), event handler 22 on electronic key $10_a$ may run a comparison on the time stamps (or similar variable indicating time of file modification), comparing the time stamp contained in the access credential file(s) stored locally on electronic key $10_a$ with that contained in the file(s) received from electronic key $10_b$. If event handler 22 determines that the access credential file(s) transmitted by electronic key $10_b$ predates the access credential file(s) stored in memory of $10_a$, event handler 22 of key $10_a$ may initiate a replacement of the outdated file by transmitting the most recent access credential file(s) via wireless interface 114 to electronic key $10_b$. Thereafter, electronic keys $10_a$ and $10_b$ may similarly initiate communications with other electronic keys $10_{a-n}$ such that all deployed keys in access control system 100 receive the updated access credential file(s) as originally updated, by the administrator, on electronic key $10_a$.

Enablement of wireless communications module 30 to facilitate communications between electronic keys $10_{a-n}$ may occur automatically or in response to user action. To illustrate, event handler 22 of each electronic key $10_{a-n}$ may be configured to enable its respective wireless communications module 30 at synchronized intermittent times, for example every 30 minutes. Alternatively, event handler 22 may enable wireless communications module 30 if a signal(s) produced by accelerometer 42 indicates that electronic key 10 is not stationary. In this manner, electronic keys $10_{a-n}$ may communicate with one another during transportation or movement of keys throughout access control system 100.

In further implementations, event handler 22 of each electronic key $10_{a-n}$ may enable its corresponding wireless communications module 30 during synchronized time periods and thereafter attempt to establish a wireless communications link via communication network 150 (not shown in FIG. 6), thus enabling all electronic keys $10_{a-n}$ in access control system 100 to communicate with one another irrespective of relative proximity.

In yet further implementations, administrators or users of electronic keys $10_{a-n}$ may actively induce establishment of wireless interface 114 between two or more electronic keys by subjecting electronic key 10 to a particular motion and/or force. To illustrate, users of two electronic keys deployed in access control system 100, such as electronic key $10_a$ and $10_b$, may induce communications between electronic keys $10_{a,b}$ by tapping the two keys together. Here, event handler 22 (on each key $10_{a,b}$) may be configured to enable wireless communications module 30 in response to a signal(s) produced by accelerometer 42 indicating electronic key 10 was subjected to a force exceeding or matching a predetermined threshold, such as that typically registered when electronic key 10 is tapped against a solid surface. While tapping the two keys together is one example of force applied by the user, skilled persons will appreciate that event handler 22 may be configured to enable wireless communications module 30 in response to any distinguishable force or motion experienced by electronic key 10. To conserve power in various implementations, event handler 22 may be configured such that wireless communications module 30 is enabled for a brief period to establish wireless interface 114 between electronic keys. If wireless interface 114 is not established during this brief period, wireless communications module 30 may be disabled (similar to the technique described above with reference to FIG. 5). Optionally, event handler 22 may alert users of successful and/or unsuccessful establishment of wireless interface 114 (and for example, success and/or failure of subsequent communications) by actuating beeper 44 and/or LED 46 such that users may reliably ascertain whether a particular key has been updated with a new credential or system information.

It will be appreciated by skilled persons that electronic keys $10_{a-n}$ may optionally communicate with other electronic devices in the same automated, or semi-automated, manner as they communicate with one another (i.e. where user or administrator input is limited or absent). To illustrate, electronic key 10 may be configured to operate in the manner of a client device in access control system 100, thereby allowing administration or updating of electronic key 10 while reducing power consumption by operating in a client-server relationship with other devices. In this client-server relationship, electronic key 10 may be configured in a default low power (or sleep state) wherein wireless communications module 30 and other functional components are disabled or otherwise consume reduced, minimal, or zero power. Here, for example, event handler 22 may periodically enable wireless communications module 30 and thereafter attempt to establish wireless interface 114 with a dedicated system server operating on an electronic device that is connected to a building WLAN and located away from electronic key 10. For example, wireless interface 114 may be established while a user carries electronic key 10 throughout various locations of access control system 100. Upon establishment of wireless interface 114, event handler 22 may be configured to automatically retrieve an updated access credential from the system server to replace or modify its own access credential file(s) in the same manner described above with respect to key-to-key communications. In other implementations, event handler 22 may report access events logged by the key to the system server. In this manner, event handler 22 may automatically (e.g. without user input) manage access credentials on the key and report previous access events to the system server. Here, as above with respect to key-to-key communication, web server 24 may be a software program configured to both generate and send electronic data request messages (e.g. HTTP request messages) as well as receive and respond to electronic data request messages. For example, in addition to being configured as a client device (where web server 24 is typically generating request messages), electronic key 10 could alternatively be configured as a server device, and a remote client device may periodically query electronic key 10 to retrieve access events stored thereon. In this instance, web server 24 would typically be responding to received request messages and communicating with event handler 22 to prepare the appropriate responses.

Figure 7:
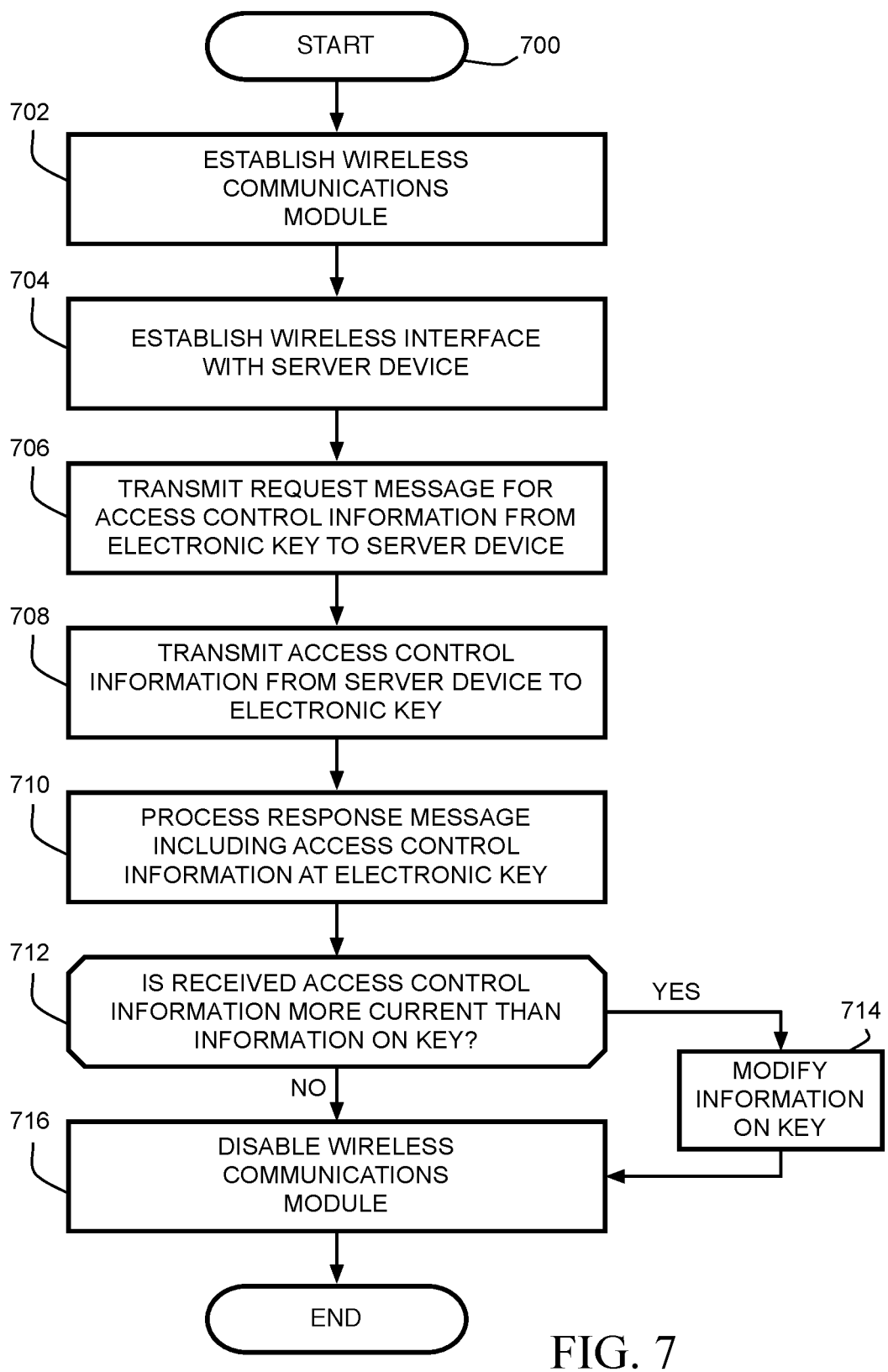
FIG. 7 is a flowchart illustrating an example method for automatically updating access control information of a portable electronic key configured to operate in a client-server relationship with a remote server device.

Referring to FIG. 7 to illustrate further, a method for automatically (e.g. without input or action from a user of the key) updating access control information of an electronic key configured to operate in a client-server relationship with a remote server device will be described in accordance with at least some embodiments. The method is initiated at step 700 and proceeds to step 702 where event handler 22 enables wireless communications module 30. Depending on the arrangement and characteristics of the access control system 100, event handler 22 may be configured to enable wireless communications module 30 with varying degrees of frequency. In some implementations of step 702, event handler 22 may enable wireless communications circuitry at predetermined periodic intervals, such as every 10 minutes. It will be appreciated that the periodic intervals may vary in duration depending on the characteristics of access control system 100. For instance, during certain hours of the day the intervals may be of shorter duration to facilitate increased control and visibility during peak access control system traffic. In other implementations of step 702, event handler 22 may enable wireless communications module 30 based, at least in part, on previous access events. For instance, after electronic key 10 successfully unlocks electronic locking device 110, event handler 22 may enable wireless communications module 30 at one-minute intervals for a predetermined period of time.

After wireless communications module 30 has been enabled, the method proceeds to step 704 where event handler 22 attempts to establish wireless interface 114 with a device associated with access control system 100. According to various embodiments, event handler 22 may for example attempt to establish wireless interface 114 with a device configured to behave as an access control information server for access control system 100. For instance, a device configured to behave as a system server may store a master copy of access control information associated with all devices in access control system 100. In this example, an administrator or user may modify access control information stored on the server for subsequent distribution to other devices in access control system 100. In this manner, the system server performs automated updating and/or administration of client devices located anywhere within access control system 100 when the client devices, such as electronic keys $10_{a-n}$, "check in" with the server.

After wireless interface 114 is established in step 704, the method proceeds to step 706 where event handler 22 initiates transmission of a request message (e.g. HTTP) to the server device (via wireless interface 114), the request message including an instruction for the server device to transmit, to electronic key 10, current access control information. For example, the server device may transmit the most recently modified access credential for electronic key 10. In other examples of step 706, the server device may transmit audit trail information (e.g. details of previous access events) associated with other keys in access control system 100 to facilitate redundancy by maintaining multiple copies of access control information in different locations of access control system 100. In step 708, the server device transmits a response message to electronic key 10 comprising access control information that is responsive to the request message sent from electronic key 10 in step 706. The method then proceeds to step 710 where web server 24 processes the response message sent in step 708 and passes the access control information included in the response message to event handler 22. In step 712, event handler 22 determines whether the access control information received from the server device was updated more recently (i.e. is more current) than corresponding access control information stored in flash memory 40 of electronic key 10. For instance, where the access control information transmitted in step 708 includes an access credential for electronic key 10, event handler 22 may compare the time of modification for the access credential stored in flash memory 40 with that of the access credential received from the server device. If the access credential received from the server device was modified more recently, the method proceeds to step 714 where event handler 22 replaces (or modifies) the access credential stored in flash memory 40 with the updated information received from the server device before disabling wireless communications module 30 in step 716. Upon completion of the method, electronic key 10 may optionally alert a user that access control information of electronic key 10 was updated or modified. In this manner, electronic key 10 may automatically receive updated access control information while moving throughout access control system 100 and without any action or cooperation by the user of electronic key 10. This is particularly advantageous where the user of electronic key 10 may prefer to avoid updating access control information, for example where the electronic key 10 is lost or stolen.

In a further example, a device configured to behave as a system server may store access control information for all electronic keys in access control system 100. Here, event handler 22 of electronic key 10 may send an HTTP request message to the server device including an instruction for the server device to respond with the most recent access events associated with electronic key 10. In this example, upon receipt of the response message from the server device, event handler 22 may be configured to compare the access events transmitted by the server device with a record of access events performed by electronic key 10. If event handler 22 determines that electronic key 10 has performed access events more recently than the access events reported by the server device, event handler 22 may transmit all access events performed by electronic key 10 to the server device (or alternatively, all access events completed after a particular date and time), thereby updating at the server device, the details of access events associated with electronic key 10.

In other implementations, a particular electronic key 10 may serve as a dedicated server/administrator key, for example operating to update other electronic keys $10_{a-n}$. Event handler 22 on a dedicated server key may be configured such that wireless communications module 30 is uninterruptedly enabled, or enabled more often than typical keys deployed in the system, to increase opportunities to connect with other electronic keys $10_{a-n}$ that are configured to behave as clients.

In accordance with at least some embodiments, event handler 22 may be configured to operate in an emergency mode with modified behavior. The threshold for what constitutes an emergency may depend wholly, or in part, on the arrangement and characteristics of access control system 100. For example, event handler 22 may be configured to enter an emergency mode when a signal(s) produced by accelerometer 42 indicates movement of electronic key 10 exceeding a predetermined velocity or speed (e.g. if the user of an electronic key was sprinting or operating a vehicle when this would not be customary behavior for a user in this particular access control system 100). In other implementations, event handler 22 may be configured to enter an emergency mode if a signal(s) produced by accelerometer 42 indicates electronic key 10 has remained stationary for an extended period of time (e.g. when the user in this particular access control system 100 is typically in motion). Additionally, a system administrator or user may manually instruct an electronic key 10 to enter emergency mode via mobile device 120 and/or stationary electronic device 130, for example by utilizing a web browser to send an HTTP request message (directly to the key or to a server in periodic communication with the key) comprising instructions to enter emergency mode.

In emergency mode, event handler 22 may be configured to temporarily or permanently disable or revoke all access credentials for electronic key 10. For instance, in emergency mode event handler 22 may be configured such that it will perform no action in response to an engagement event (i.e. electronic key 10 may not operate any locking device while in emergency mode). Further, event handler 22 may automatically enable wireless communications module 30 during emergency mode such that a system administrator or user may quickly monitor access events and/or control permissions of electronic key 10. For example, a system administrator may utilize a web browser on mobile device 120 to send an HTTP request message containing instructions to modify or delete the access credential of electronic key 10 operating in emergency mode. Optionally, event handler 22 may initiate an alarm or other indication that electronic key 10 has entered emergency mode, for example by actuating beeper 44 and/or LED 46.

Event handler 22 may continue to operate in emergency mode for a predetermined duration. Optionally, event handler 22 may operate in emergency mode until a signal(s) produced by accelerometer 42 is indicative of a predetermined force (e.g. tapping the key twice on a table may disable emergency mode). Still further, an administrator or user may instruct electronic key 10 to exit emergency mode for example by sending an HTTP request message from an application on a remote device such as mobile device 120.

Additional implementations of communications may be illustrated by way of examples of emergency situations. For instance, in emergency mode event handler 22 may be configured to enable wireless communications module 30 and thereafter uninterruptedly or periodically attempt transmission of an access credential file(s) containing master permissions (i.e. permission to open all access points in access control system 100) to all electronic keys $10_{a-n}$. In this manner, users of the electronic keys $10_{a-n}$ receiving the master permissions may thereafter operate all access points in access control system 100 to better respond to the emergency. In this example, each electronic key $10_{a-n}$ in access control system 100 may have a master file(s) stored thereon containing an access credential with permissions to open all electronic locking devices in the system. A master file(s) may, for example, not be accessible by event handler 22 unless it is operating in emergency mode.

In an alternative implementation, event handler 22 of an electronic key 10 operating in emergency mode may be configured to disable/revoke its own access credential while additionally transmitting master permissions to all other electronic keys $10_{a-n}$. Further, event handler 22 may be configured to transmit information to other electronic keys $10_{a-n}$ containing instructions to enter emergency mode.

In other examples of emergency situations, event handler 22 of an electronic key 10 operating in emergency mode may be configured to attempt to establish wireless interface 114 between electronic key 10 and a dedicated server key or dedicated system server operating on a remote device and report the emergency mode status of electronic key 10 such that an administrator or other users may be alerted. The dedicated server key or system server may respond, for example, by revoking the access credential for electronic key 10 or by transmitting instructions to enter emergency mode to all other electronic keys $10_{a-n}$ deployed in access control system 100.

In yet further examples of emergency situations, where a system administrator or user identifies a particular electronic key 10 as stolen or otherwise being operated improperly, the administrator or user may manually revoke the access credential for the identified key via a web browser on mobile device 120 or stationary electronic device 130. The administrator may accomplish this by establishing wireless interface 114 with the stolen key directly and updating the access permissions or other access credential information stored thereon (e.g. by sending an HTTP request message or by other methods described herein). Alternatively, where event handler 22 is configured to disable/revoke the access credential upon entering emergency mode, the administrator may simply instruct the stolen key to enter emergency mode.

In situations where a stolen or lost key is unavailable for communication (e.g. if the key is too distant to establish wireless interface 114 and/or not connected to a WLAN) an administrator or user may disable the stolen key by utilizing key-to-key communications as described above. In this example, each electronic key 10 in the set of electronic keys $10_{a-n}$ may be configured to store, in memory, a copy of the access credential for every other key in access control system 100. To illustrate further, an administrator may establish wireless interface 114 with any available electronic key $10_{a-n}$ in access control system 100 to modify and/or revoke the access credential for the stolen key stored on the available key. For instance, where electronic key $10_c$ was stolen, the administrator may establish wireless interface 114 with available electronic key $10_e$ and thereafter modify the access credential for stolen electronic key $10_c$. Electronic key $10_e$ containing the newly modified access credential for stolen electronic key $10_c$ may then initiate a replacement of obsolete access credential information stored on other electronic keys $10_{a-n}$ utilizing the methods described herein. The efficiency of key-to-key communications may be enhanced during emergency mode by configuring event handler 22 to increase the frequency of communication attempts and/or to increase the frequency or duration that wireless communications module 30 is enabled and available for communications. Similarly, an administrator could employ a similar method by updating access credential information on a device configured to operate as a system server in access control system 100. In this example, electronic keys $10_{a-n}$ may be configured to operate as client devices, periodically exchanging messages related to access control information with the server device. Here, the administrator may conveniently update access credential information for stolen electronic key $10_c$ as stored on the server device (e.g. by sending an HTTP request from a web browser to the server device or via other methods as described herein). Thereafter, as electronic keys $10_{a-n}$ periodically exchange messages with the server device, the updated access credential information for stolen electronic key $10_c$ will be distributed throughout access control system, eventually reaching stolen electronic key $10_c$ and rendering it inoperative.

In accordance with various embodiments, event handler 22 can utilize signals received via wireless communications module 30 to modify behavior of electronic key 10, such as by selectively enabling or disabling certain responses to an engagement event or by modifying communications between electronic key 10 and electronic locking device 110. For instance, wireless interface 114 can be employed to transmit a signal to electronic key 10 in order to enable electronic key 10 to operate electronic locking device 110 (e.g. initiate communication of an access credential). As described elsewhere in this disclosure, electronic key 10 may have, stored in memory sites thereof, a valid access credential associated with at least one electronic locking device 110. Electronic key 10 can present the access credential to electronic locking device 110 in order to initiate an unlocking event at the locking device. However, in accordance with at least some embodiments, electronic key 10 can be configured such that it will not unlock or operate electronic locking device 110 until an activation signal is received at the key, even where electronic key 10 otherwise possesses a valid access credential associated with the locking device. In other words, electronic key 10 can be configured such that a valid access credential and receipt or presence of an activation signal are both required to enable the key to unlock at least one locking device deployed in access control system 100. In this manner, additional safeguards can be applied to circumvent unauthorized uses of electronic key 10 and electronic locking device 110. It will be appreciated that an activation signal may, in some implementations, facilitate more exacting administrative control over use or functionality of electronic key 10. An activation signal can be any information capable of enabling at least one function of electronic key 10. In some implementations, an activation signal can be utilized by a device other than electronic key 10 in order to effectively limit functionality of the key. To illustrate, electronic locking device 110 can be configured to ignore or reject attempts to initiate an unlocking sequence unless electronic key 10 presents, to the locking device, information carried by an activation signal.

Various other implementations and examples will be described below. It will be understood that an activation signal differs from an access credential in that an activation signal, by itself, will not permit electronic key 10 to unlock electronic locking device 110. Electronic key 10 must also possess an access credential (or portion thereof). In some implementations, information carried by an activation signal can be combined with or modify information in memory of the key to generate a valid access credential. In other applications, information carried by an activation signal can be presented to electronic locking device 100 in addition to an access credential (i.e. multi-factor authentication). In yet other instances, an activation signal can be employed by event handler 22 to modify the key's response to an engagement event. Accordingly, transmission of an activation signal between devices in access control system 100 does not entail transmission of an access credential or other highly sensitive information that, if intercepted, could compromise security of the system.

In some embodiments of this disclosure, an activation signal can comprise a portion of an access credential, whereby event handler 22 can utilize data carried by the activation signal to modify information in memory sites of the key (e.g. flash memory 40). For example, event handler 22 can apply a first portion of the access credential received via the activation signal to a second, remaining portion of the access credential stored in flash memory 40 to complete the access credential for subsequent transmission to electronic locking device 110. In other embodiments, an activation signal may convey information wholly unrelated to an access credential stored in memory of electronic key 10. Here, an activation signal can comprise, to identify one example, a randomly generated binary or character string that electronic key 10 presents to electronic locking device 110 (e.g. contemporaneously with an access credential). Here, event handler 22 can be configured to deny transmission of an access credential without having first received an activation signal, or alternatively electronic locking device 110 may be configured to commence an unlocking sequence only where both an access credential and activation signal have been received from electronic key 10. In various implementations, electronic locking device 110 can compare the activation signal information presented by electronic key 10 with information stored in memory sites of the locking device. To illustrate, electronic locking device 110 may have a list of randomly generated binary strings stored in memory, representing potential activation codes. Electronic locking device 110 can compare the binary string carried by the activation signal (and subsequently presented by electronic key 10) with the list of activation codes stored in memory before determining whether to initiate an unlocking sequence. If the electronic key 10 presents both a valid access credential and valid activation signal, an unlocking sequence can be initiated in accordance with methods and techniques described in this disclosure. In some instances, electronic locking device 110 may utilize a rolling code implementation, whereby the activation signal information presented by electronic key 10 may only be valid for a limited period of time or limited number of access events before the locking device advances a pointer in memory or otherwise selects a new activation code from the list of randomly generated binary strings. Skilled persons will understand that data other than a binary string can be conveyed by an activation signal and used by electronic key 10 and/or electronic locking device 110 to enable the key to cause initiation of an unlocking event. Text files, image files, audio files, character strings, and other data capable of transmission via the protocols described in this disclosure may be conveyed by an activation signal in accordance with various embodiments.

By implementing access control system 100 such that receipt or presence of an activation signal at electronic key 10 is required prior to the key unlocking an entry point, surreptitious use of a key by an unauthorized individual can be further restricted in the event the key is lost, stolen, or left unattended. For example, if electronic key 10 is configured to require receipt of an activation signal from mobile device 120 prior to operation of electronic locking device 110, an unauthorized individual possessing a lost or stolen key will be unable to access locking devices without also having access to mobile device 120 for retrieval of the activation signal. As will be understood from the various example implementations described in this disclosure, data carried by an activation signal is supplemental to an access credential. Accordingly, surreptitious interception of information carried by an activation signal will not, by itself, permit a wrongdoer to unlock or operate electronic locking device 110. To illustrate, by utilizing data carried by an activation signal as one component of a multi-factor authentication (MFA) at electronic locking device 110, interception of activation signal data will not compromise the remaining elements of the MFA process (e.g. the access credential). Likewise, where data carried by an activation signal is used by event handler 22 to enable key functionality (e.g. enable key to transmit access credential) or to modify access credential information stored in memory of the key, interception of the activation signal will not permit a wrongdoer to derive an access credential or otherwise operate electronic locking device 110. Delivery of an activation signal can enable remote administration of electronic key 10 while reducing the risk that sensitive information may be intercepted during delivery of the activation signal, for example by eavesdropping on wireless interface 114 (e.g. Bluetooth sniffing, capturing unsecured Wi-Fi signals, etc.). Accordingly, where a system administrator or other user is concerned that a wrongdoer may eavesdrop on transmissions to electronic key 10, the key can be provided with an access credential(s) in a secure location or via a secure communication channel, and thereafter be enabled in the field remotely via an innocuous activation signal. In this manner, the behavior or usage of electronic key 10 can be remotely managed without risking interception of an access credential by an unauthorized party; for example, where the only means of delivering access control information to a remote electronic key 10 is through an unsecured wireless network. Concerns related to interception of communications with electronic key 10 illustrate but one example of when it may be appropriate to employ an activation signal to remotely enable the key and skilled persons will recognize that an activation signal may have utility in other scenarios. For illustration, in some access control systems it may be desired to facilitate remote management of an electronic key, however the access credential may be too large to effectively transmit to a remote key using available communications protocols or the credential may include information not well suited for long-range wireless transmission.

To illustrate further, an electronic key 10 having, stored in memory sites thereof, an access credential for operation or unlocking of electronic locking device 110, can be configured to further require receipt of an activation signal prior to presenting the access credential to the locking device. The activation signal can be transmitted to electronic key 10 via wireless interface 114, such as in the form of a Bluetooth signal generated by communications circuitry of mobile device 120. The activation signal can be generated by a software program executing on mobile device 120, or generated by another device such as stationary electronic device 130 and relayed to electronic key 10, for instance via wireless communications circuitry of mobile device 120 or via network devices operably associated with communication network 150. In other applications, mobile device 120 can receive information comprising or related to an activation signal from another device, such as stationary electronic device 130, and store the information in memory sites of mobile device 120 for subsequent transmission to the key. In some implementations, an activation signal can be transmitted to electronic key 10 by stationary electronic device 130 or other devices, for example via communication network 150 or other wireless communication technologies known to skilled persons.

In accordance with certain embodiments, delivery of the activation signal to electronic key 10 can be initiated upon (or contingent upon) the key holder performing a user verification procedure. The user verification procedure can, for example, be implemented in a manner designed to verify the key holder's identity, location, or other condition. Where mobile device 120 is configured, for example, as a conventional smartphone or cell phone, the key holder can input a PIN code on a touchscreen of mobile device 120 in order to initiate delivery of the activation signal to electronic key 10. Here, software code executing on mobile device 120 can verify accuracy of the user input, such as by verifying that the user input matches a corresponding PIN code stored in memory. Alternatively, mobile device 120 can forward the user input to a remote device (e.g. stationary electronic device 130) for user verification; for instance, where the remote device is a system server configured to store and distribute access control information associated with various devices in access control system 100.

Skilled persons will understand that, alternatively, electronic key 10 can be configured to facilitate user verification using hardware or software of the key rather than, or in addition to, mobile device 120; such as by employing accelerometer 42 or other components. Similar to the selective enabling of key functionality described above with respect to FIG. 5, signals produced by accelerometer 42 can be used to verify the identity of a user of electronic key 10, for example by verifying that a user has unique knowledge of a distinctive pattern of movement. To illustrate, a user of electronic key 10 can subject electronic key 10 to a particular force or pattern of forces in order to verify that an authorized user is indeed controlling the key. Each user of access control system 100 can be assigned a distinctive pattern of forces (i.e. physical manipulation of the key) to verify his or her identity. For example, a key holder can verify his identity by tapping the key against a hard surface in a particular pattern or rhythm that is known only to the key holder (and in some cases a system administrator). Skilled persons will appreciate that subjecting electronic key 10 to a distinctive pattern of movement is but one example of verifying key holder identity and that other methods may have utility. For example, if electronic key 10 is implemented with a touchscreen, keypad, or other means to provide user input, a key holder can enter a secret PIN code or other private information at the key itself. Upon completion of the user verification procedure, electronic key 10 can be configured to send a request (e.g. by automatically transmitting an HTTP request) for an activation signal to mobile device 120 or stationary electronic device 130. Mobile device 120 or stationary electronic device 130 can prepare a response message comprising information associated with an activation signal for delivery to electronic key 10.

To illustrate another example, electronic key 10 can include a fingerprint reader to enable collection of biometric information at the key itself. Here, event handler 22 can be configured to require collection of a valid fingerprint from a key holder prior to requesting an activation signal. Alternatively, an activation signal may expire periodically, such as every two hours, and event handler 22 can be configured to renew or extend expiration of the activation signal in response to collecting a valid fingerprint image. To illustrate, an activation signal received at electronic key 10 can be associated with an expiration variable in memory sites (e.g. flash memory 40) of the key. Here, collection of a valid fingerprint image at electronic key 10 can extend expiration of the activation signal by modifying the expiration variable, for example by advancing the variable by one hour each time a valid fingerprint is imaged at the reader. In certain cases, an activation signal received at electronic key 10 can be stored in memory indefinitely and only made available (e.g. to event handler 22) upon completion of a user verification procedure at the key. For instance, data associated with an activation signal can be stored in memory sites of electronic key 10. Here, the activation signal data can be made unavailable to event handler 22 until completion of a user verification procedure. Upon completion of the user verification procedure, such as collection of a valid fingerprint or input of a correct PIN code, the activation signal data can be made available to event handler 22, for example for presentation to electronic locking device 110 as part of an MFA process to initiate an unlocking sequence. In various implementations, the activation signal data can be made available to event handler 22 for a limited period after completion of the user verification procedure, such as one day or eight hours. In some applications, the user verification procedure at the key may only be completed during certain times or at certain locations. For instance, event handler 22 can be configured to solicit user input (e.g. collecting a PIN code or activating a fingerprint reader) in response to engagement of electronic key 10 with electronic locking device 110. In other instances, event handler 22 may only collect user input during a key holder's scheduled shift (e.g. 8 a.m.-5 p.m.).

Figure 8:
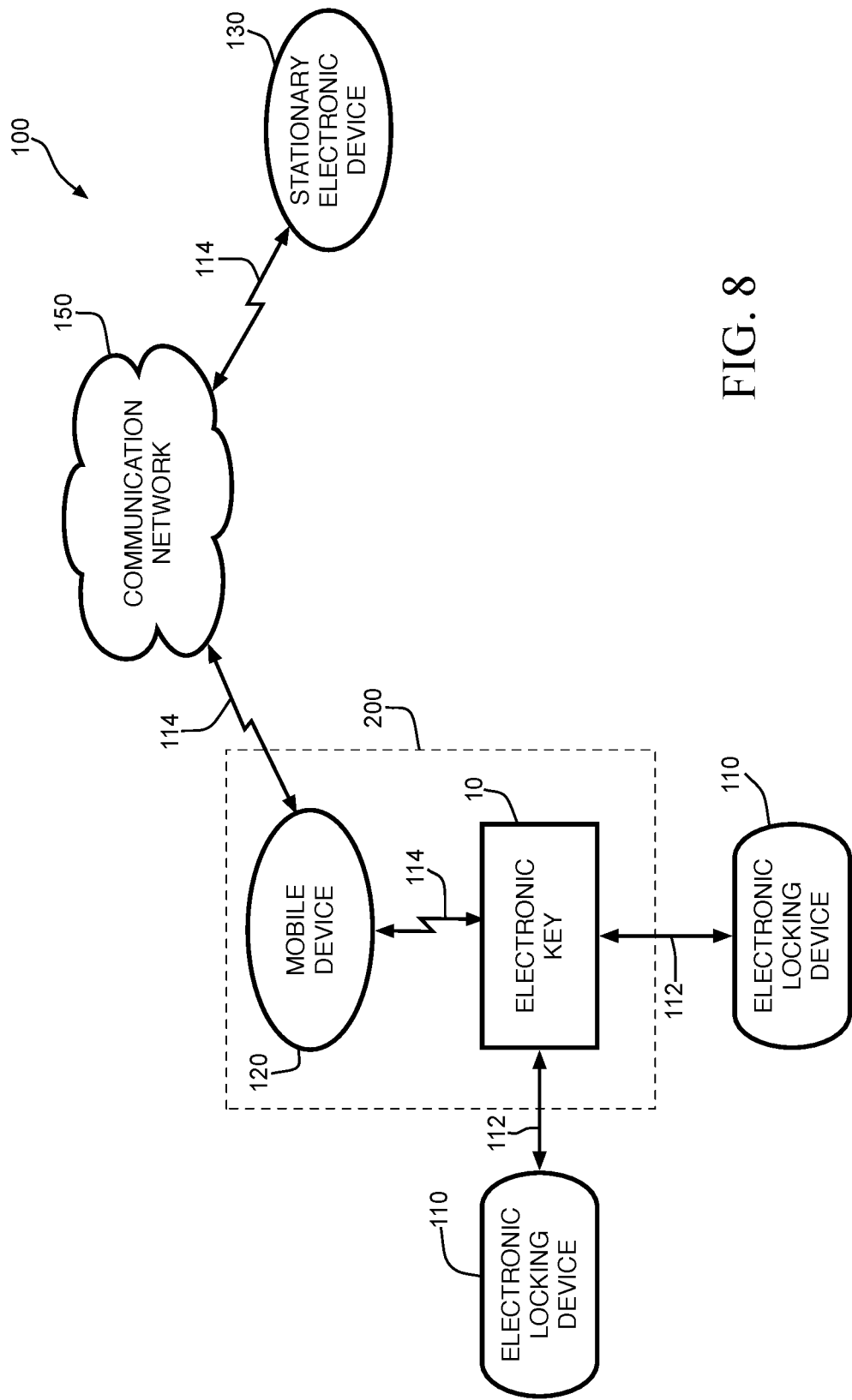
FIG. 8 is a block diagram illustrating an example access control system in accordance with various embodiments.

Referring now to FIG. 8, in at least some embodiments, a user of electronic key 10 can, for instance when moving throughout or to and from access control system 100, carry both the key and mobile device 120. User device boundary 200 illustrates the devices carried by the user in accordance with various embodiments illustrated by FIG. 8. It will be appreciated that a key holder may carry other access control devices and that the devices depicted inside user device boundary 200 in FIG. 8 are illustrative in nature. If electronic key 10 is implemented without hardware or software components necessary to perform the desired user verification procedure, the user can perform the verification procedure at another device having the desired hardware or software functionality to facilitate the verification procedure, such as mobile device 120. Thereafter, mobile device 120 can be configured to initiate transmission of the activation signal to electronic key 10 via wireless interface 114 in accordance with the communication protocols described in this disclosure (e.g. Bluetooth, Wi-Fi, Wi-Fi direct, NFC, etc.).

In certain implementations, mobile device 120 can be configured to collect and verify biometric information of a key holder, for example a fingerprint or retina pattern, prior to transmitting the activation signal. Other biometric information can be collected using known methods and thereafter used to verify the key holder. DNA information, facial features, voice characteristics, vein patterns, and other identifying information may have utility in various embodiments of the user verification procedure described in this disclosure. Biometric information can be combined as desired with traditional forms of user input, such as a PIN code, to provide additional confidence in verifying a key holder. Skilled persons will appreciate that collection and verification of user information (e.g. biometric) can occur independently of a user's control over electronic key 10. In some instances, user verification can be triggered periodically or upon occurrence of a particular access event. A key holder may or may not be aware that a user verification procedure has been conducted. In other cases, a user may be required to actively initiate the user verification procedure, for instance by pressing a button on electronic key 10 or mobile device 120, placing a fingertip on or near a fingerprint reader, causing electronic key 10 to engage electronic locking device 110, requesting access to a certain locking device (e.g. via a user interface of mobile device 120), or performing another specific action.

In some applications, GPS signals or other location-based data can induce transmission of an activation signal to electronic key 10. For instance, mobile device 120 can be implemented as a conventional smartphone or other smart device with a GPS receiver capable of receiving signals associated with the location of the device. Skilled persons will appreciate that a smart device can be implemented as a commercially available smartphone, tablet, or other electronic device providing similar functionality. As used in this disclosure, the term "smart device" refers to a network device that is generally connected to other devices or networks and can operate to some extent interactively and autonomously. Examples of smart devices include smartphones (e.g. Apple iPhone, Android phones, etc.), tablets and phablets (e.g. Apple iPad, Amazon Kindle, Google Nexus, Samsung Note etc.), smart watches (e.g. Apple Watch, Samsung Gear, etc.), personal desktop computers, and laptop computers, to identify a few specific electronic devices. In various aspects, verification of a user's location can trigger delivery of an activation signal. To illustrate, GPS coordinates associated with the location of mobile device 120 can be compared with GPS coordinates associated with the location of a particular electronic locking device 110. Where comparison of the respective GPS coordinates indicates that mobile device 120 is within a designated distance (e.g. twenty meters) of electronic locking device 110, an activation signal can be provided to electronic key 10, thereby enabling the key to operate or unlock the proximate locking device (assuming the key possesses a valid access credential for the locking device). Skilled persons will understand that the designated distance can be established as desired (e.g. by a system administrator) and may vary from system to system and even across locking devices in the same system. The distance can depend, in part, on proximity of other locking devices, availability of GPS signals, the desired level of security, and other factors. Comparison of GPS coordinates associated with mobile device 120 and electronic locking device 110 can occur periodically (e.g. every fifteen seconds), on demand (e.g. by request from the key holder or other individual), or upon occurrence of a particular event (e.g. event handler 22 detecting an engagement event), to identify a few examples.

Skilled persons will appreciate that a comparison of GPS coordinates or other location data can be performed by software code executing on any one of multiple devices deployed in access control system 100, such as mobile device 120, stationary electronic device 130, electronic key 10, or even electronic locking device 110. To illustrate, mobile device 120 may periodically compare coordinates received by a GPS receiver of the mobile device with coordinates associated with a locking device. If a periodic comparison indicates that mobile device 120 is within a designated distance of electronic locking device 110, mobile device 120 can display a button on a user interface of the device that, when selected by the user, causes delivery of an activation signal to electronic key 10. Alternatively, mobile device 120 can automatically deliver an activation signal to electronic key 10 and may alert the user of such, for example via an audible or visual signal emitted by mobile device 120 or by transmitting instructions to the key to actuate beeper 44 and/or LED 46. Thereafter, when a periodic comparison of GPS coordinates indicates that mobile device 120 has moved beyond a designated distance from the locking device, the button can be removed or disabled from the user interface, whereby a key holder will no longer be able to initiate delivery of the activation signal. It will be appreciated that the user verification procedure in this example utilizes data other than manually entered user input. Here, a user of electronic key 10 may own or be issued (e.g. by a system administrator) a particular mobile device. In certain applications, it can be presumed that a user will carry his or her mobile device or maintain a close proximity to the mobile device at all times. Accordingly, data associated with a mobile device 120 owned by or issued to a key holder can be used to indirectly verify the identity or location of the key holder. In other words, if it is known or assumed that a key holder is carrying his mobile device 120, GPS coordinates associated with the mobile device can be used to approximate the key holder's location.

Location of the key holder (or mobile device 120) can be used as an element (or the only element) of a user verification procedure, whereby an activation signal is delivered to electronic key 10 only upon verifying that the key holder is within a designated distance of electronic locking device 110, such as 10 meters. To illustrate, if GPS coordinates associated with mobile device 120 indicate that the device is within close proximity to the intended electronic locking device 110, it is likely that the authorized user is also near the device and an activation signal can be delivered to electronic key 10. In the event electronic key 10 is lost or stolen, an unauthorized individual attempting to use the key to open electronic locking device 110 will be unable to gain entry unless mobile device 120 (i.e. the authorized user) is within the prescribed proximity to satisfy the user verification criteria. Even in the unlikely event that an unauthorized individual is able to receive an activation signal at electronic key 10 (e.g. where mobile device 120 is within range), the close proximity of the authorized key holder (carrying mobile device 120) may facilitate identification or apprehension of the wrongdoer. In this and other implementations, an unauthorized user would need to obtain control of both electronic key 10 and mobile device 120 in order to theoretically gain access to a locking device, reducing the risk that a missing key, in and of itself, will compromise security of the system. Additional safeguards can be implemented by taking an MFA approach with the user verification procedure. For example, by prompting a user of mobile device 120 to provide valid user input in addition to satisfying a proximity limitation. Too illustrate, upon a GPS coordinate comparison indicating that mobile device 120 is within the prescribed range of electronic locking device 110, the mobile device can prompt the key holder to enter a PIN code or place a fingertip on a fingerprint reader. Here, delivery of an activation signal is initiated only upon a user being within close proximity to electronic locking device 110 and further providing accurate user verification credentials (i.e. a correct PIN code or fingerprint pattern). Skilled persons will understand that location-based verification methods can be combined with other security features as desired. Referencing both GPS coordinates and user input, such as a PIN code, is just one example of employing MFA methodology in a user verification procedure. Other combinations and criteria can have utility in various embodiments and implementations.

In some aspects, location-based data associated with other devices in access control system 100 or associated with a user of electronic key 10 can be used to initiate delivery of an activation signal to the key. To illustrate, a user can be provided with an electronic device capable of receiving or determining location information, for example a GPS receiver in a smart watch worn by the user. Here, mobile device 120 (or another device deployed in access control system 100) can acquire the location information from the smart watch using any of the communication protocols described in this disclosure. Thereafter, the location information can be compared with a second set of location information, for example GPS coordinates associated with the installed location of locking devices in access control system 100. In certain applications, software code executing on the smart watch can perform the location comparison. If desired, the smart watch (or similar electronic device) can be configured to provide an activation signal to electronic key 10 in the same manner as described with respect to mobile device 120. Skilled persons will appreciate that a watch is but one example of a wearable device that can be configured to cooperate with mobile device 120 and/or electronic key 10. Other wearable devices can have utility in various systems, for example smart glasses or other eyewear, earpieces or headsets, athletic training bands or bracelets, communication hardware embedded in clothing or shoes (e.g. GPS receiver), and other wearable devices capable of communicating via the wireless protocols described in this disclosure.

In other implementations, a user verification procedure can merely verify whether a key holder has possession of, or access to, mobile device 120. In such applications, a user may be required to simply select a button (e.g. via a touchscreen-enabled user interface) on mobile device 120 to initiate transmission of the activation signal. In certain variations, unique information associated with mobile device 120, such as a serial number or media access control (MAC) address, can be utilized to ensure that only an authorized or intended mobile device is able to initiate delivery of an activation code. In other applications, a user can be required to touch electronic key 10 to mobile device 120, or otherwise bring the key and device into close proximity. Here, signals produced by accelerometer 42 and signals produced by similar circuitry of mobile device 120 can be compared to verify proximity, for example by analyzing the similarity of forces measured in each device within a brief period. Alternatively, communications circuitry of electronic key 10 and cooperative circuitry associated with mobile device 120 can be used to exchange data (e.g. short-range communication such as a Bluetooth or NFC handshake) to verify proximity of the two devices prior to mobile device 120 initiating transmission of an activation signal to the key. In this manner, the risk of a lost or stolen key being used in an unauthorized access event can be mitigated by requiring a key holder to also have access to a second device, here mobile device 120.

As described above, mobile device 120 can be configured to initiate transmission of an activation signal in accordance with various embodiments. Mobile device 120 may, to identify a few examples, generate an activation signal, retrieve activation signal data stored in memory sites of the mobile device for transmission to the key, or instruct a remote device, such as stationary electronic device 130, to provide the activation signal. Skilled persons will appreciate that other methods and techniques may be employed to cause delivery of the activation signal; in some implementations, delivery of the activation signal can occur automatically (e.g. automatic transmission from mobile device 120 or stationary electronic device 130) or upon the occurrence of a particular event, such as an engagement event involving electronic key 10 and a particular electronic locking device 110. As described above with respect to using location-based data for user verification, delivery of an activation signal to electronic key 10 can be contingent upon the satisfaction of multiple conditions. For instance, user verification can entail a key holder initiating engagement of electronic key 10 with a particular electronic locking device 110 or other device, and further providing valid user input or biometric information to mobile device 120. In this manner, engagement of electronic key 10 with a locking device associated with the requested activation signal can serve to verify a user's presence at the device without receiving GPS signals or other location data. In other instances, a key holder can be required to provide valid user input to mobile device 120 at a certain time or location (e.g. during a particular time window or at particular GPS coordinates). In further applications, a key holder can be required to perform specific access events to trigger delivery of an activation signal, such as causing engagement of electronic key 10 with a particular sequence of locking devices. To illustrate, a system administrator may assign a user to a specific route, requiring the user to access a particular sequence of locking devices as the user moves through access control system 100. If the user accesses a locking device out of order or accesses a device not designated by the assigned route, delivery of further activation signals can be denied. Verification of the user's adherence to the assigned route can be determined, for example, by referencing a record of access events stored in memory sites of electronic key 10, mobile device 120, or electronic locking device 110. In yet other implementations, a user can be required to satisfy several conditions, for example where it is desired to have strict safeguards to minimize the risk of unauthorized key use. Here, an MFA approach to user verification can require the key holder (or devices controlled by the key holder) to satisfy a number of criteria in order to trigger delivery of an activation signal. A key holder can be required to transport electronic key 10 and/or mobile device 120 to a particular location (i.e. satisfy a GPS boundary), during a certain time or day, provide valid biometric information, and further input a valid PIN code before an activation code will be made available to the key. Skilled persons will understand that other criteria can be combined as desired and that such criteria will depend, in part, on the characteristics of the particular access control system.

Referring again to FIG. 8, in accordance with at least some embodiments, a system administrator or other system user may wish to execute a user verification procedure and/or deliver an activation signal to electronic key 10 at a location or during a time where electronic key 10 is only capable of short-range wireless communication. Here, wireless communications module 30 may be configured to communicate in accordance with various known protocols via a WPAN or WLAN, for example using Bluetooth, NFC, infrared data association (IrDA), Wi-Fi, Wi-Fi Direct, or ZigBee protocols. In such circumstances, electronic key 10 may be unable to exchange access control information with a server device (e.g. a device serving access control information managed by the administrator), such as where communication network 150 (e.g. cellular or other WWAN) is unavailable or otherwise incompatible with wireless communications module 30 of electronic key 10. For instance, if stationary electronic device 130 is configured to behave as a server device, such as by executing a software program to manage and distribute access control information, a system administrator may modify system information via a user interface at stationary electronic device 130. A system administrator can, for example, modify permissions for a key holder by designating locking devices for which electronic key 10 requires an activation signal. The system administrator may wish to quickly update electronic key 10 to implement the new activation signal requirements. Here, without an available long-range communications link between the server device and electronic key 10, the system administrator can utilize other devices, such as mobile device 120, to facilitate remote administration of electronic key 10.

Skilled persons will understand communications circuitry of mobile device 120 can be utilized in various implementations to facilitate exchange of access control information between electronic key 10 and a server device. For example, if access control system 100 is implemented such that a server device is responsible for verifying input collected during a user verification procedure, user input collected at electronic key 10 or mobile device 120 can be transmitted from the mobile device to a server device for verification. In some systems, information sent from a server device and intended for electronic key 10 can be routed through mobile device 120 for efficiency reasons, such as where available protocols for communication between the server and the key are slower or unreliable. To illustrate, if wireless communication module 30 is configured to communicate according to at least one of an 802.11x protocol, a Bluetooth protocol, and an NFC protocol, a key holder may transport electronic key 10 to a remote location, such as a remote utility or power station, where the only WWAN available is implemented using a cellular protocol (e.g. GSM, UMTS, LTE). Here, electronic key 10 may be incapable of communicating with a server device due to its inability to utilize the available cellular network. In various implementations, a key holder can utilize a device (i.e. other than electronic key 10) capable of communicating via the available WWAN, for example mobile device 120, to initiate and/or perform a user verification procedure and thereby cause delivery of an activation signal to electronic key 10. For instance, where stationary electronic device 130 is implemented as an access control server comprising a software program to generate and deliver activation signals to remote devices via the WWAN, an activation signal can first be transmitted to mobile device 120 (e.g. via an LTE cellular network where mobile device 120 is implemented as a smartphone). Stationary electronic device 130 can be configured to transmit activation signal data to mobile device 120 via wireless interface 114, for example using LTE cellular protocols. Mobile device 120 can then transmit the activation signal to wireless communication module 30 (of electronic key 10) via wireless interface 114. In various implementations, the activation signal can be transmitted from mobile device 120 to electronic key 10 via known short-range wireless communications protocols, such as Bluetooth or NFC. Skilled persons will appreciate that various other communications protocols can be utilized to provide electronic key 10 with activation signal data. For instance, mobile device 120 and electronic key 10 can both be connected to an available WLAN, such as an 802.11x Wi-Fi network.

In certain aspects, the activation signal can be transmitted to mobile device 120 and stored in memory sites of the mobile device for a limited period of time or indefinitely. In one example, both mobile device 120 and electronic key 10 can be transported by a key holder to a location without any available long-range communication link to a server device (such as stationary electronic device 130). Here, upon completion of a user verification procedure as described elsewhere in this disclosure, mobile device 120 can retrieve, from memory sites, information associated with an activation signal (e.g. information received previously from a server device) and initiate transmission to electronic key 10 via wireless interface 114, such as via a Bluetooth communication link. In implementations where mobile device 120 is capable of performing the desired user verification procedure, mobile device 120 can receive access control information from a server device and store the information in memory sites indefinitely. Thereafter, mobile device 120 can, without establishing a wireless communication link with the server device, use at least a portion of the previously received access control information to generate an activation signal for delivery to electronic key 10. In various implementations, it is possible to initiate delivery of activation signal data from mobile device 120 to electronic key 10 independently of external communication networks and/or devices. For instance, if electronic key 10 and mobile device 120 are transported by a key holder to a remote utility station without access to a cellular network, WLAN, or the like, mobile device 120 can retrieve activation signal data from its memory sites and transmit an activation signal directly to wireless communication module 30. Accordingly, mobile device 120 can, in various implementations, generate and/or deliver an activation signal to electronic key 10 without access to a WWAN or other method of long-range communication. By way of this example and variations thereof, a system administrator or lock owner can implement remote activation of an electronic key 10, verifying authorized users of the key even at locations or during times where it is impractical to establish a real-time communication link between a server device and devices carried by the user.

As described with respect to various examples throughout this disclosure, wireless communications module 30 can be configured to exchange information using multiple communications protocols. For instance, wireless communications module 30 can be configured to exchange information with a server device over a WLAN implemented using an 802.11x protocol and further configured to exchange information with mobile device 120 over a WPAN implemented using a Bluetooth protocol. Wireless communications module 30 can, as described above, comprise multiple communications chips operably linked to microprocessor 16, or wireless communications module 30 can comprise an integrated communications chip enabling data exchange over many different wireless protocols. Skilled persons will appreciate that wireless communications module 30 can include multiple antennas or utilize a single antenna shared across several protocols (e.g. Wi-Fi and Bluetooth). In implementations where electronic key 10 may be deployed across diverse environments and systems, wireless communications module 30 can enable communications across a sizeable number of wireless protocols, for instance 802.11x, Bluetooth, Bluetooth Low Energy (BLE), NFC, and cellular protocols. Here, wireless communications module 30 can, for example, be configured to listen for wireless signals across numerous protocols, exchanging information with the first available protocol. To illustrate, wireless communications module 30 can wake-up periodically and listen for wireless signals across 802.11x, Bluetooth, and cellular LTE protocols. If wireless communications module 30 detects a wireless signal formatted according to an 802.11x Wi-Fi protocol, event handler 22 may determine if electronic key 10 possesses the proper credentials (e.g. network password, if applicable) to communicate via the Wi-Fi network. If electronic key 10 has the proper network credentials, event handler 22 can establish wireless interface 114 in accordance with the available 802.11x Wi-Fi protocol. In some instances, multiple wireless signals may be available for establishing wireless interface 114. For example, wireless communications module 30 may detect wireless signals across multiple protocols, such as 802.11x, Bluetooth, and Bluetooth Low Energy. Here, event handler 22 can be configured to automatically select, for example, the protocol with the highest signal strength or with the highest maximum data rate. Alternatively, event handler 22 can be configured to always select an 802.11x protocol if available. In some implementations, a user can instruct electronic key 10 to utilize a desired protocol. To illustrate, electronic key 10 may be configured to exchange access control information with various devices in access control system 100 via Bluetooth protocols. Here, wireless communications module 30 may be configured to automatically establish wireless interface 114 using a Bluetooth high speed protocol. For power consumption reasons (e.g. low battery) or other motivations, a key holder may cause electronic key 10 to switch to a Bluetooth low energy protocol. Here, the user can instruct wireless communications module 30 to utilize a Bluetooth low energy protocol, for example via button or touchscreen commands on electronic key 10 or, alternatively, via a user interface of mobile device 120 which can relay the instructions to electronic key 10. In other implementations, wireless communications module 30 may switch the default protocol in response to an event, such as battery capacity dropping below a certain percentage. In some instances, event handler 22 can change the default wireless protocol for wireless communications module 30 based on GPS signals received at the key. In certain locations, electronic key 10 can be configured to utilize Bluetooth low energy protocols to establish wireless interface 114, in other locations electronic key 10 may select an 802.11x protocol or NFC protocol for establishing wireless interface 114. In this manner, an administrator or key holder can configure electronic key 10 to communicate using different wireless protocols depending, in part, on how the key holder wishes to utilize the key.

As described above, event handler 22 can be configured such that it will refrain from initiating an unlocking sequence (e.g. transmitting an access credential) in response to an engagement event until or unless an activation signal is received at the key, for example via wireless communications module 30. In at least some implementations, event handler 22 can be configured to require receipt or presence of an activation signal at electronic key 10 prior to initiating unlocking of certain electronic locking devices, but not require an activation signal to operate or unlock other devices in access control system 100. Similarly, certain electronic locking devices can be configured to require MFA to initiate an unlocking device, wherein electronic key 10 must present at least an access credential and activation signal data. In other implementations, event handler 22 can be configured to require an activation signal only during particular times or on certain days. In some applications, event handler 22 can be configured to require an activation signal only when operating in an emergency mode. For example, where signals produced by accelerometer 42 cause event handler 22 to enter an emergency mode, event handler 22 can be configured to require an activation signal to operate or unlock electronic locking device 100. In yet other examples, event handler 22 can be configured to always require an activation signal prior to unlocking or operating a device (e.g. electronic locking device 110). In this manner, additional security measures can be applied to some or all devices deployed in access control system 100. It will be understood that the behavior of electronic key 10 can be configured as desired and that other conditions or criteria can be used to determine whether an activation signal is required to unlock or operate a device.

Event handler 22 can be configured, in at least some implementations, to alert a key holder that an activation signal is required and/or that an activation signal has not yet been received at electronic key 10. For instance, upon engagement of electronic key 10 with another device, such as electronic locking device 110, event handler 22 can determine if the requisite activation signal has been received at the key. If the activation signal is not present (or has expired), event handler 22 can be configured to alert the user, for example by initiating a visual or audible alarm via LED 46 or beeper 44. In some applications, event handler 22 can be configured to transmit a signal or electronic message to mobile device 120 or other devices deployed in access control system 100 to alert the key holder, system administrator, or other user of the system that an activation signal is required or is not present at the key. The alert indicating an absent or invalid activation signal can, for example, be the same or similar to an alert indicating that a key is not authorized to operate an engaged device (e.g. electronic locking device 110).

Skilled persons will appreciate that an activation signal can be implemented using various known methods and techniques. As described above with respect to various examples, electronic key 10 can be configured such that it will not initiate an unlocking sequence (e.g. by causing transmission of an access credential) until an activation signal is received at the key. For instance, the activation signal can comprise instructions to modify a variable referenced by event handler 22 as part of its response to an engagement event. A variable associated with receipt of the activation signal can be configured in a default 'false' state, indicating an activation signal has not yet been received or that a previously received signal is invalid or expired. Receipt of the activation signal at the key causes this variable to change from the false state to a 'true' state. Event handler 22 can be configured to reference this variable in response to detection of an engagement event and only initiate an unlocking sequence if the variable is, at the time of reference, set to true. In various implementations, receipt of the activation signal may change the variable to a true state for a limited period of time (e.g. twenty seconds or ten minutes). To illustrate, receipt of the activation signal can, as described briefly above, modify a variable referenced by event handler 22. Event handler 22 can be configured to change the variable back to its pre-activation state (i.e. false) upon expiration of a period of time, such as ten minutes. In other implementations, the activation signal may change the variable to a true state for an indefinite period of time. For instance, the variable can remain in a true state until the occurrence of a particular access event triggers its change back to a false state, such as completion of an unlocking sequence associated with electronic locking device 110 or a request initiated by a system administrator or other user of the system. In this manner, an activation signal can be configured to enable electronic key 10 for a limited period of time. A small window of activation (e.g. five minutes) may further reduce the risk that a lost or stolen key can be used in an unauthorized manner at a later time or date. Skilled persons will understand that modification of a variable in memory sites of electronic key 10 is but one method of limiting the duration that a key is enabled by an activation signal and that other implementations may have utility. For example, the activation signal could include information associated with an expiration time and/or date. This expiration information can be transmitted, along with an access credential, to electronic locking device 110. Here, the locking device can be configured to perform a comparison of the expiration information against an internal clock of the locking device. Where the expiration information indicates an expiration time that predates the internal clock of the locking device, entry may be denied (even where the access credential is otherwise valid).

In accordance with at least some embodiments, the activation signal can comprise data representing a portion of the access credential. To illustrate, an access credential stored in memory of electronic key 10 may be incomplete or otherwise invalid without access to at least a portion of the data carried by the activation signal. For example, if electronic locking device 110 is configured to use an access credential composed of a randomly generated set of three words or character strings, electronic key 10 may store two of the three strings in memory sites and thereafter receive the third and final string via an activation signal. Receipt of the activation signal at electronic key 10 provides the data necessary to complete or validate the access credential for use with at least one device, such as electronic locking device 110. In this example, event handler 22 can be configured to apply the applicable information carried by an activation signal to the incomplete access credential stored in memory sites of the key. Verification that a valid activation signal has been received at electronic key 10 can be performed contemporaneously with authentication of the access credential. For instance, where data carried by the activation signal is used to complete or otherwise transform the access credential into a valid state, subsequent authentication of the access credential during engagement with electronic locking device 110 effectively confirms that a valid activation signal was received at the key.

In certain implementations, electronic locking device 110 can be configured such that additional information (i.e. MFA) is required to authenticate user access during particular times or on certain dates. For instance, where electronic locking device 110 is configured to accept an access credential, such as a randomly generated password (e.g. binary or character string), during normal business hours, the locking device may require MFA to operate or unlock the device during non-business hours, such as requiring the key to also present supplementary binary data, an authorization code, or a user or key ID number, to identify a few examples. To illustrate, an electronic locking device 110 installed on an entry point of a retail store can be configured to unlock in response to valid passwords transmitted by electronic key 10 between the hours of 8 a.m. and 5 p.m. During all other hours, a user wishing to enter the store may be required to transmit a valid password and further present an access code that is, for example, only made available to supervisors or managers of the store. In accordance with various implementations, electronic key 10 can receive the additional information (e.g. the supervisor access code) via mobile device 120 or stationary electronic device 130 in the form of an activation signal and thereafter present the password and supervisor access code to electronic locking device 110 in order to access the store during off-hours. By providing the supervisor access code to electronic key 10 via an activation signal transmitted by mobile device 120, it is possible to reduce or eliminate the risk that a lost or stolen supervisor's key (i.e. a key with 24-hour access) can be used by an unauthorized party.

In further applications, event handler 22 can utilize information included in the activation signal to perform a transformation or other modification of an access credential prior to presenting the credential to electronic locking device 110. In yet another example, event handler 22 can be configured in a default low power or sleep state characterized by event handler 22 wholly ignoring engagement events or simply declining to commence unlocking events in response to an engagement event. In various implementations, receipt of the activation signal will "wake up" event handler 22 such that it will thereafter respond to an engagement event, such as by initiating transmission of an access credential. It will be understood that other implementations of an activation signal may have utility and that the foregoing examples are provided to aid understanding of the various embodiments of this disclosure.

Figure 9:
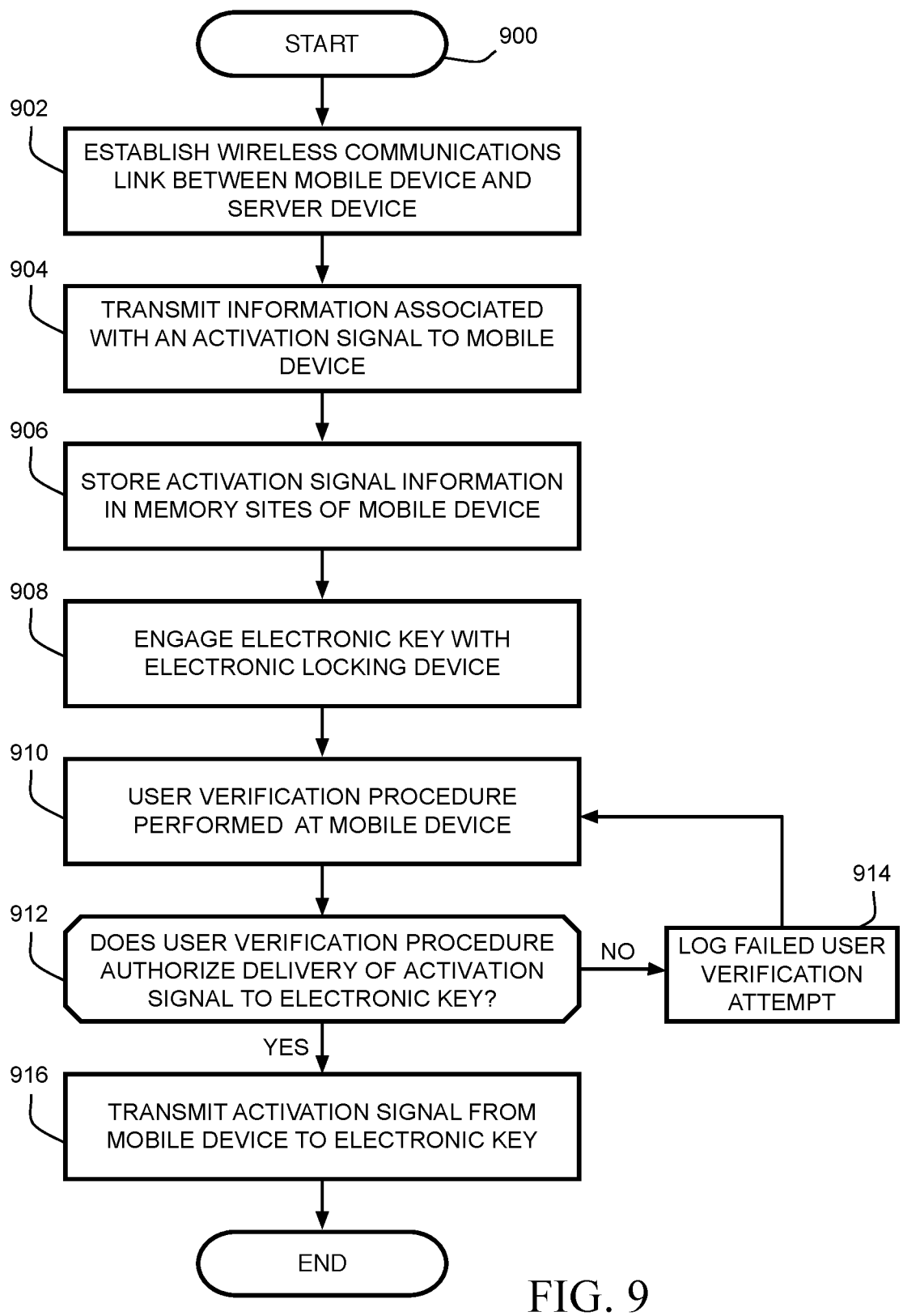
FIG. 9 is a flowchart illustrating an example method for delivering an activation signal to enable functionality of an electronic key in response to a user verification procedure executed at a mobile device.

Referring now to FIG. 9, a method for delivering an activation signal to enable an electronic key in response to a user verification procedure executed at a mobile device will be described in accordance with at least some embodiments. The method is initiated at step 900 and proceeds to step 902 where a wireless communications link is established between mobile device 120 and a server device. The wireless communications link can be implemented according to any of the wireless communications protocols and technologies described in this disclosure, such as a link over a WWAN implemented in accordance with standardized cellular protocols, or via a WLAN implemented in accordance with an 802.11x protocol. Here, the server device can be any combination of hardware and software configured to manage access control information for access control system 100. The server device can comprise or have access to an access control database or other repository of access control information. The access control information may be managed by a system administrator or alternatively, users can modify access control information associated with certain devices. In some implementations, stationary electronic device 130 can be configured to operate as a server device, comprising a software program to view, manage, and distribute access control information. In other implementations, the server device can be implemented as a cloud service and made available to users and administrators of access control system 100 via an Internet connection. In yet other implementations, a second mobile device 120 can be configured to operate as a server device, executing a software program to manage access control information for the first mobile device, other mobile devices, electronic keys, and the like.

Upon establishment of the wireless communications link in step 902, the method proceeds to step 904 where information associated with an activation signal is transmitted from the server device to mobile device 120 via the wireless communications link (e.g. wireless interface 114 implemented according to a standardized cellular or Wi-Fi protocol). The information associated with the activation signal may depend, in part, on how the activation signal is implemented. As described above, a multitude of methods and technologies for implementing an activation signal can have utility in various embodiments of this disclosure. For instance, the server device can transmit an activation code to mobile device 120. This code can be, for example, a randomly generated binary string used by electronic key 10 or electronic locking device 110 during a response to an engagement event. Alternatively, the information can be software code for executing an application on mobile device 120 that causes or enables the mobile device to transmit data to electronic key 10 including instructions to modify a variable associated with the activation signal. In other implementations, the information transmitted to mobile device 120 can identify the particular electronic locking devices 110 for which electronic key 10 requires an activation signal. Thereafter, mobile device 120 can generate an activation signal for the identified locking devices and transmit the signal(s) to electronic key 10. The examples of information described with respect to step 904 is provided for illustrative purposes and is not intended to limit the scope of step 904 or the implementation of an activation signal. Other examples of information associated with an activation signal are described elsewhere in this disclosure. Skilled persons will appreciate that the information transmitted to mobile device 120 in step 904 can be any information used by mobile device 120 to generate, transmit, or otherwise cause delivery of an activation signal to electronic key 10.

In step 906, mobile device 120 can store, in memory sites of the mobile device, at least a portion of the activation signal information received in step 904. In certain implementations, mobile device 120 can be configured to store the information indefinitely. For instance, where the information received in step 904 causes a software application to execute on mobile device 120, a user of the device may receive the information during an initial use of electronic key 10 or other devices in access control system 100. To illustrate, where the information received in step 904 comprises software code for a mobile application, a user can download the mobile application from the server device (e.g. via a mobile application store or repository) and the application (i.e. software code) may remain on the phone until the user initiates an uninstall process. In other implementations, the information can be associated with an expiration date or the mobile device can otherwise be configured such that it will not use the information after a particular duration, such as one week or eight hours. Here, the user may request the information as needed, such as when it has expired, or the information can be periodically transmitted to mobile device 120 according to a schedule. Skilled persons will understand that, in other embodiments, mobile device 120 can be configured such that it is not necessary to store the information in memory. For instance, as described above with respect to some implementations, mobile device 120 can be configured to simply relay information to electronic key 10 without writing the information to memory for later use.

In step 908, a key holder causes electronic key 10 to engage with electronic locking device 110. In this example, electronic key 10 is configured such that it requires an activation signal to unlock or otherwise operate the engaged electronic locking device 110. As described above, event handler 22 can be configured to perform various responses to an engagement event, including instances when electronic key 10 requires an activation signal to operate or communicate with an engaged device. To reiterate one of the examples described above, event handler 22 can, in response to detecting an engagement event between electronic key 10 and electronic locking device 110, reference a variable in memory sites of electronic key 10 to determine if an activation signal has been received at the key. In step 908 of this example method, an activation signal has not been transmitted to electronic key 10. Here, event handler 22 can alert the user that an activation signal is required and has not been received, for example via LED 46, beeper 44, or by transmitting a signal to mobile device 120 to cause circuitry of the mobile device to alert the user. In certain implementations, electronic key 10 can transmit instructions to mobile device 120 causing the mobile device to initiate a user verification procedure in step 910. To illustrate, electronic key 10 can transmit a signal causing mobile device 120 to prompt the key holder to enter a PIN code at the mobile device (e.g. via touchscreen input). Alternatively, a signal from electronic key 10 indicating that an activation signal is required may cause mobile device 120 to prompt the user for biometric information, such as by instructing the user to place his or her finger on a fingerprint reader associated with the mobile device. In other applications, mobile device 120 may prompt the user to capture an image of the user's face, for example via a camera operably associated with mobile device 120. Here, the image of the user's face can be compared to a previous image of the user, such as a picture taken by a system administrator when issuing electronic key 10. An image captured in step 910 can be stored in memory sites of mobile device 120 and/or transmitted to other devices. In this manner, a system administrator or other user reviewing access control information can visually verify which user requested an activation signal.

In other implementations of step 910, a signal indicating that an activation signal is required may cause mobile device 120 to present a button to the user that merely confirms that the user wishes to transmit an activation signal to electronic key 10 (e.g. an "ACTIVATE KEY" button displayed on a touchscreen of the mobile device). In this 'Activate Key' command implementation, the user verification procedure can simply verify that a key holder has access to and control of mobile device 120, as opposed to requiring the user to provide secret verification information. Here, for example, electronic key 10 can be configured such that it will only communicate with a mobile device that has previously been enrolled with a system server device (e.g. via a serial number, MAC address, etc.) or is otherwise authorized for use with devices in access control system 100. Skilled persons will understand that various known methods and techniques for enrolling mobile device 120 may have utility in implementations where a mobile device must first be registered with a system server or otherwise configured for use in access control system 100. In addition to utilizing a serial number or MAC address associated with mobile device 120, a system server can install a software application or store software code in memory sites of the mobile device that, when executed, enable the mobile device to communicate with other devices in access control system 100. To illustrate another example, a system server can store a code in memory of mobile device 120 that is exchanged with other devices (e.g. during a handshake or initialization) prior to transmitting access control information. Where mobile device 120 does not possess the proper code, the system server and other devices may refuse to communicate with the mobile device. In this manner, a lost or stolen key may not receive an activation signal from an unauthorized device, even where the user verification procedure does not require the user to input confidential or identifying information. In some implementations, an enrolled mobile device 120 can be configured to automatically transmit an activation signal to electronic key 10 in response to an indication (e.g. signal from key) that an activation signal is required. Here, the user verification procedure can be implemented in a manner that simply verifies mobile device 120 is within a designated proximity of electronic key 10, such by executing a wireless communication handshake or other exchange to verify the key is within the effective range of Bluetooth, NFC, or other short-range communication protocols. Other implementations of a user verification procedure are described elsewhere in this disclosure and may have utility in this step 910.

Upon completion of the user verification procedure in step 910, the method proceeds to step 912 where it is determined whether the user verification procedure authorizes the key holder to access electronic locking device 110. Given the diversity of methods and techniques for implementing the user verification procedure of step 910, skilled persons will appreciate that the criteria for establishing whether a key holder is authorized for access will vary, based, in part, on the implementation of a particular user verification procedure. For instance, if a user verification procedure is implemented in a manner intended to verify proximity of electronic key 10 to mobile device 120, a successful NFC or Bluetooth handshake (i.e. pairing between devices or establishing a communications link) between the two devices may satisfy the criteria necessary to authorize the key holder. Similarly, where the user verification procedure is implemented as an "ACTIVATE KEY" command (or similar button press verification) on a touchscreen or other input device associated with mobile device 120, a successful selection of the button by a user may be sufficient to authorize the key holder to access electronic locking device 110. In some cases, failing to press the button within a prescribed period may be considered an unsuccessful user verification procedure, wherein mobile device 120 will not transmit an activation signal to electronic key 10. Where the user verification procedure in step 910 requires the user to provide identifying or private information, such as a PIN code or biometric information, the criteria for authorizing transmission of an activation signal may require a perfect match. In other words, information provided by the user and corresponding reference information stored in memory sites of mobile device 120 or stored remotely (e.g. in the cloud or a remote device) must be indistinguishable. Alternatively, the criteria for a user verification procedure may factor in a margin for error, or may only require a partial match between user input (e.g. PIN, biometric, etc.) and reference information stored in memory (e.g. fingerprint profile associated with key holder). Skilled persons will appreciate that the user verification procedure of step 910 and the determination of what criteria constitutes a successful user verification may vary from system to system and that methods and techniques other than those described in the examples above can have utility in access control system 100.

The process of determining whether the user verification procedure authorizes delivery of an activation signal can be executed at mobile device 120, electronic key 10, electronic locking device 110, a remote device, such as stationary electronic device 130 (e.g. where stationary electronic device 130 is configured as a server device managing access control information for the system), or a combination of devices. For instance, software code executing on a device associated with access control system 100 can be configured to perform a comparison or otherwise verify the accuracy of information collected in step 910. To illustrate further, mobile device 120 can store a key holder profile in memory sites and reference information contained in the profile when determining if a user verification procedure is successful, for instance by executing software code to compare a PIN code provided by a user in step 910 with a PIN code stored in memory and associated with that user. In this manner, mobile device 120 can, in locations where long-range wireless communication with a server device is unavailable, facilitate execution of the user verification procedure and additionally determine if the procedure was successful.

In other implementations, mobile device 120 can transmit the user input, or other information collected during the user verification procedure, to another device to determine whether the user verification procedure permits delivery of an activation signal to electronic key 10. Here, mobile device 120 can, for instance, transmit the user verification information obtained in step 910 to electronic key 10. Event handler 22 can be configured to compare information collected in step 910 with information associated with a key holder (e.g. stored in flash memory 40 of electronic key 10). If event handler 22 determines that an activation signal should be delivered, for example by determining that a PIN entered by the user is correct, a request (e.g. HTTP) can be transmitted from electronic key 10 to mobile device 120 requesting an activation signal. Mobile device 120 can prepare a response message including an activation signal for transmission to electronic key 10 according to communication methods and techniques described in this disclosure. In other embodiments, mobile device 120 can transmit the information collected in step 910 to a remote server device via wireless interface 114, for example using a standardized cellular protocol. Thereafter, the server device can determine if the information authorizes delivery of an activation signal, such as by executing software code to compare the user verification information collected in step 910 to information associated with the user or information associated with devices controlled by the user (e.g. mobile device 120 or electronic key 10). Here, the server can wirelessly transmit an activation signal directly to electronic key 10 according to the methods and protocols described in this disclosure, or alternatively, route the activation signal through another device, such as mobile device 120 or a network communication device (e.g. router or mesh network). The foregoing examples identify just a few possible techniques for determining whether the user or device information collected in the user verification procedure of step 910 authorizes delivery of an activation signal. Skilled persons will appreciate that the wireless communications capability of the various devices described in this disclosure permit a multitude of methods and techniques for verifying the accuracy or validity of the information collected in step 910. Other methods and techniques may have utility depending on the criteria chosen for the user verification procedure of step 910.

If a user verification procedure does not authorize delivery of an activation signal (e.g. incorrect user input, failed wireless communication handshake between key and mobile device), the method can proceed to step 914 where details related to the failed user verification procedure are recorded in memory sites of at least one of mobile device 120, electronic key 10, electronic locking device 110, and a server device (i.e. remote or cloud). In some instances, a failed user verification can trigger an alarm or initiate delivery of a warning message to a remote device. To illustrate, if mobile device 120 determines that a user verification procedure is unsuccessful, mobile device 120 can transmit a message to a server device (e.g. stationary electronic device 130) to alert a system administrator of the failed user verification. In certain implementations, this step 914 may conclude the method. Alternatively, the method can return to step 910 and reinitiate the user verification procedure. In returning to step 910, the method can account for accidental entry of inaccurate user input, or a misread of biometric information, or other errors in the user verification procedure that may result in a false negative. In some variations, the method can permit a key holder to attempt a limited number of user verification procedures before terminating the method. In some instances, a failed user verification procedure(s) can initiate a safe mode to prevent unauthorized use of electronic key 10, wherein certain features of electronic key 10 and/or mobile device 120 are disabled or unavailable to the user. To illustrate an example, where the user verification procedure in step 910 is implemented such that a key holder must enter a valid PIN code at mobile device 120 or electronic key 10, the method can permit the user a limited number of attempts, such as three, in which to correctly enter the PIN code. In this example, upon entering an incorrect PIN code three times within a prescribed period, such as ten minutes, the user will be prevented from attempting further user verification procedures. Mobile device 120 or electronic key 10 can be configured to transmit a message to a server device, such as stationary electronic device 130, indicating that safe mode has been entered and functionality is limited. This alert can allow a system administrator to quickly contact a key holder to determine if a key has been lost or stolen. In order to regain access to the user verification procedure or to otherwise request an activation signal, the user may need to obtain permission from an administrator, wait for an extended period of time, or perform a different (i.e. more rigorous) user verification procedure to verify the user is indeed authorized to operate electronic key 10 in the requested manner.

If it is determined, in step 912, that the user verification procedure authorizes delivery of an activation signal to electronic key 10, the method can proceed to step 916 where an activation signal is transmitted to electronic key 10. As described above, delivery of an activation signal can be implemented in various ways and can be transmitted from various devices associated with access control system 100. Delivery of the activation signal to electronic key 10 in step 916 enables access to electronic locking device 110, as described in greater detail elsewhere in this disclosure. Upon completion of the method, mobile device 120 and/or electronic key 10 can record information related to delivery of the activation signal in memory sites, such as the time, date, identify of the locking device(s) for which the signal was requested, user input collected in step 910 such as a fingerprint pattern or image of the user's face or portion thereof, and other information that may be generated or used during execution of this method. In some implementations, mobile device 120 can be configured to transmit information associated with delivery of the activation signal to a remote device, such as a server device (e.g. stationary electronic device 130). In this manner, real-time or near real-time feedback related to activation of electronic key 10 can be viewed remotely, for example via a user interface at stationary electronic device 130 or any device configured to communicate with mobile device 120 and/or the server device (e.g. via communication network 150).

In certain embodiments, wireless communications module 30 can be configured to receive a deactivation signal to disable certain functionality of electronic key 10, for example using methods and techniques similar to those described above for enabling functionality with an activation signal. To illustrate, a key holder or system administrator may wish to deactivate certain functions of electronic key 10 if it is anticipated that the key will be left unattended for an extended period, such as at the end of a key holder's work shift. In various implementations, a deactivation signal can be transmitted to electronic key 10 in order to place the key in a state characterized by at least one function being disabled or unavailable to a key holder. A deactivation signal can, to identify a few examples, cause electronic key 10 to enter a sleep or low-power state, disable key communications with some or all devices, or disable responses to an engagement event, such as by flipping an activation signal variable from a true state back to a false state. In accordance with some implementations, upon receipt of a deactivation signal, electronic key 10 can be configured to disable the function(s) until receipt of an activation signal that includes instructions to restore the function(s), or alternatively, functionality may be restored after a designated time period, in accordance with a key holder schedule, or upon occurrence of a particular access event, such as engagement with a certain electronic locking device. Other conditions or events can be used to restore key function after receipt of a deactivation signal. In some instances, completion of a user verification procedure, such as imaging of a valid fingerprint, can trigger restoration of key functions. Skilled persons will understand that any of the methods and techniques described above with respect to utilizing or initiating transmission of an activation signal can similarly be used in connection with a deactivation signal to limit functionality of the key. To illustrate one example, in an emergency situation a system administrator can, via a user interface associated with a server device (e.g. stationary electronic device 130), initiate transmission of a deactivation signal to prevent a key holder from entering a dangerous room or location. The deactivation signal may be delivered to electronic key 10 via communication network 150 or other communications technologies described in this disclosure or known to skilled persons. In the event an appropriate wireless communications link between the server device and electronic key 10 is unavailable, the deactivation signal can be delivered to mobile device 120 for subsequent transmission to the key.

Any reference in this disclosure to "one embodiment," "an embodiment," "some embodiments," "various embodiments," etc., means that a particular feature, structure, or characteristic described in connection with the embodiment is included in at least one embodiment of this disclosure. The appearances of such phrases, and variations thereof, including references to "implementations," are not necessarily all referring to the same embodiment or implementation. When a particular feature, structure, or element is described in connection with any embodiment or implementation, it is understood that it is within the purview of persons of skill to affect such feature, structure, or element in connection with any of the other embodiments and implementations.

It should be understood that as used in this disclosure and throughout the claims that follow, the phrase "A or B" means any one of (A), (B), or (A and B), which is synonymous with the phrase "A and/or B." Alternatively, just a "/" may be use for conciseness. For example, the phrase "A/B" also means "A or B." The phrase "at least one of A, B, and C" means (A), (B), (C), (A and B), (A and C), (B and C), or (A, B, and C). Further, as used in this disclosure and throughout the claims that follow, the meaning of "in" includes "in" and "on" unless the context clearly prescribes otherwise. The terms "comprising," "having," and "including" are synonymous, unless the context dictates otherwise. As used in this disclosure, the terms "conveying" and "carrying" are described with reference to information included in a communication signal and are synonymous, unless the context dictates otherwise.

Although embodiments have been described with reference to a number of illustrative embodiments and implementations thereof, it will be appreciated that numerous other modifications and embodiments can be devised by skilled persons without departing from the spirit and scope of the underlying principles of this disclosure. The scope of this disclosure should, therefore, be determined only by the following claims.

It is claimed:

1. An electronic key comprising:
one or more processors; and
memory storing instructions that, when executed by the one or more processors, cause the electronic key to:
deliver, in response to the electronic key coupling with an electronic lock, electrical power to energize circuitry of the electronic lock;
transmit, based on access control information associated with the electronic key, an unlocking signal that causes the electronic lock to change from a locked state to an unlocked state, the unlocked state permitting a key holder to access a secured area;
store, in the memory of the electronic key, an audit trail record including details related to unlocking the electronic lock;
broadcast, via a wireless wide area network (WWAN) and in response to storing the audit trail record in the memory of the electronic key, an electronic message comprising a request to establish a WWAN communications link between the electronic key and an access control server; and
responsive to establishing the WWAN communications link, initiate an audit session comprising the exchange of asynchronous messages for transferring, to the access control server, a change in the audit trail record stored in the memory of the electronic key, the change in the audit trail record corresponding to an access event completed during the audit session.

2. The electronic key of claim 1, wherein the WWAN is a cellular communications network.

3. The electronic key of claim 1, wherein the electrical power energizes at least one of an electric motor or solenoid associated with the electronic lock.

4. The electronic key of claim 3, wherein the change from the locked state to the unlocked state comprises the electric motor or solenoid causing a displacement of a lock pin.

5. The electronic key of claim 1, wherein the coupling is a mechanical coupling, and wherein the electronic key delivers the electrical power to the electronic lock via an electrical contact or magnetic induction.

6. The electronic key of claim 1, wherein the electronic message is broadcast at periodic intervals until the WWAN communications link is established between the electronic key and the access control server.

7. The electronic key of claim 1, wherein the electronic message is broadcast independent of input by a user of the electronic key.

8. A method, performed by an electronic key, for auditing activity in an access control system, the method comprising:
delivering, in response to the electronic key coupling with an electronic lock, electrical power to energize circuitry of the electronic lock;
transmitting, based on access control information associated with the electronic key, an unlocking signal that causes the electronic lock to change from a locked state to an unlocked state, the unlocked state permitting a key holder to access a secured area;

storing, in memory of the electronic key, an audit trail record including details related to unlocking the electronic lock;

broadcasting, via a wireless wide area network (WWAN) and in response to storing the audit trail record in the memory of the electronic key, an electronic message comprising a request to establish a WWAN communications link between the electronic key and an access control server; and responsive to establishing the WWAN communications link, initiating an audit session for transferring, to the access control server, a change in the audit trail record stored in the memory of the electronic key, the change corresponding to an access event completed during the audit session.

9. The method of claim 8, wherein the WWAN is a cellular communications network.

10. The method of claim 8, wherein the electrical power energizes at least one of an electric motor or solenoid associated with the electronic lock.

11. The method of claim 10, wherein the change from the locked state to the unlocked state comprises the electric motor or solenoid causing a displacement of a lock pin.

12. The method of claim 8, wherein the coupling is a mechanical coupling, and wherein the electronic key delivers the electrical power to the electronic lock via an electrical contact or magnetic induction.

13. The method of claim 8, wherein the electronic message is broadcast at periodic intervals until the WWAN communications link is established between the electronic key and the access control server.

14. A non-transitory computer-readable storage medium comprising instructions that, when executed by one or more processors of an electronic key, cause the portable electronic key to:

deliver, in response to the electronic key coupling with an electronic lock, electrical power to energize circuitry of the electronic lock;

transmit, based on access control information associated with the electronic key, an unlocking signal that causes the electronic lock to change from a locked state to an unlocked state, the unlocked state permitting a key holder to access a secured area;

store, in memory of the electronic key, an audit trail record including details related to unlocking the electronic lock;

broadcast, via a wireless wide area network (WWAN) and in response to storing the audit trail record in the memory of the electronic key, an electronic message comprising a request to establish a WWAN communications link between the electronic key and the access control server; and responsive to establishing the WWAN communications link, initiate an audit session comprising the exchange of asynchronous messages for transferring, to the access control server, a change in the audit trail record stored in the memory of the electronic key, the change in the audit trail record corresponding to an access event completed during the audit session.

15. The non-transitory computer-readable storage medium of claim 14, wherein the WWAN is a cellular communications network.

16. The non-transitory computer-readable storage medium of claim 14, wherein the electrical power energizes at least one of an electric motor or solenoid associated with the electronic lock.

17. The non-transitory computer-readable storage medium of claim 16, wherein the change from the locked state to the unlocked state comprises the electric motor or solenoid causing a displacement of a lock pin.

18. The non-transitory computer-readable storage medium of claim 14, wherein the coupling is a mechanical coupling, and wherein the electronic key delivers the electrical power to the electronic lock via an electrical contact or magnetic induction.

19. The non-transitory computer-readable storage medium of claim 14, wherein the electronic message is broadcast at periodic intervals until the WWAN communications link is established between the electronic key and the access control server.

20. The non-transitory computer-readable storage medium of claim 14, wherein the electronic message is broadcast independent of input by a user of the electronic key.

* * * * *